United States Patent [19]

Zapletal et al.

[11] Patent Number: 4,548,241
[45] Date of Patent: Oct. 22, 1985

[54] COIL SPRING ASSEMBLY MACHINE

[75] Inventors: Henry Zapletal, Carthage, Mo.; Horst F. Wentzek; George M. Chembakaffery, both of Kenosha, Wis.

[73] Assignee: Leggett & Platt, Incorporated, Carthage, Mo.

[21] Appl. No.: 611,490

[22] Filed: May 17, 1984

Related U.S. Application Data

[62] Division of Ser. No. 300,995, Sep. 10, 1981, Pat. No. 4,492,298.

[51] Int. Cl.[4] .................................................. B21F 35/00
[52] U.S. Cl. ...................................... 140/89; 140/3 CA
[58] Field of Search .................... 140/89, 92.8, 92.9, 140/92.93, 92.7, 92.3, 3 CA; 198/651, 624, 722, 726, 486, 425

[56] References Cited

U.S. PATENT DOCUMENTS

| 1,633,010 | 6/1927 | Findora | 140/89 |
| 3,288,176 | 11/1966 | Davis | 140/3 CA |
| 3,588,993 | 6/1971 | Turner | 198/425 |

FOREIGN PATENT DOCUMENTS 638408 12/1978 U.S.S.R. ........................ 140/3 CA

Primary Examiner—Francis S. Husar
Assistant Examiner—Linda McLaughlin
Attorney, Agent, or Firm—Wood, Herron & Evans

[57] ABSTRACT

A machine for connecting successive rows of coil springs together into a coil spring assembly. The machine, in preferred form, initially picks up a row of coil springs by inserting a pick up finger into the barrel of each coil and moving the springs onto a support platen. In the course of transporting the coils between pick up and the support platen, the pick up fingers change the spacing of the coils. The springs are then compressed against the support platen to a desired height through use of a reciprocable compression bar. Thereafter, and through use of rotatable transfer fingers on a transfer shaft, the springs are removed from under the compression bar, and are moved into clamping dies. Leading rotary transfer fingers on the transfer shaft first pull the row of springs out from under the compression bar, and trailing rotary fingers then push the springs into the downstream one of upper and lower clamping dies. If a leading row of coil springs are already present in the clamping dies, the rows of clamping dies clamp together the upper and lower end loops of the leading and trailing rows of coil springs. The rows of springs are then connected together by helical lacing wires while clamped between the clamping dies.

6 Claims, 21 Drawing Figures

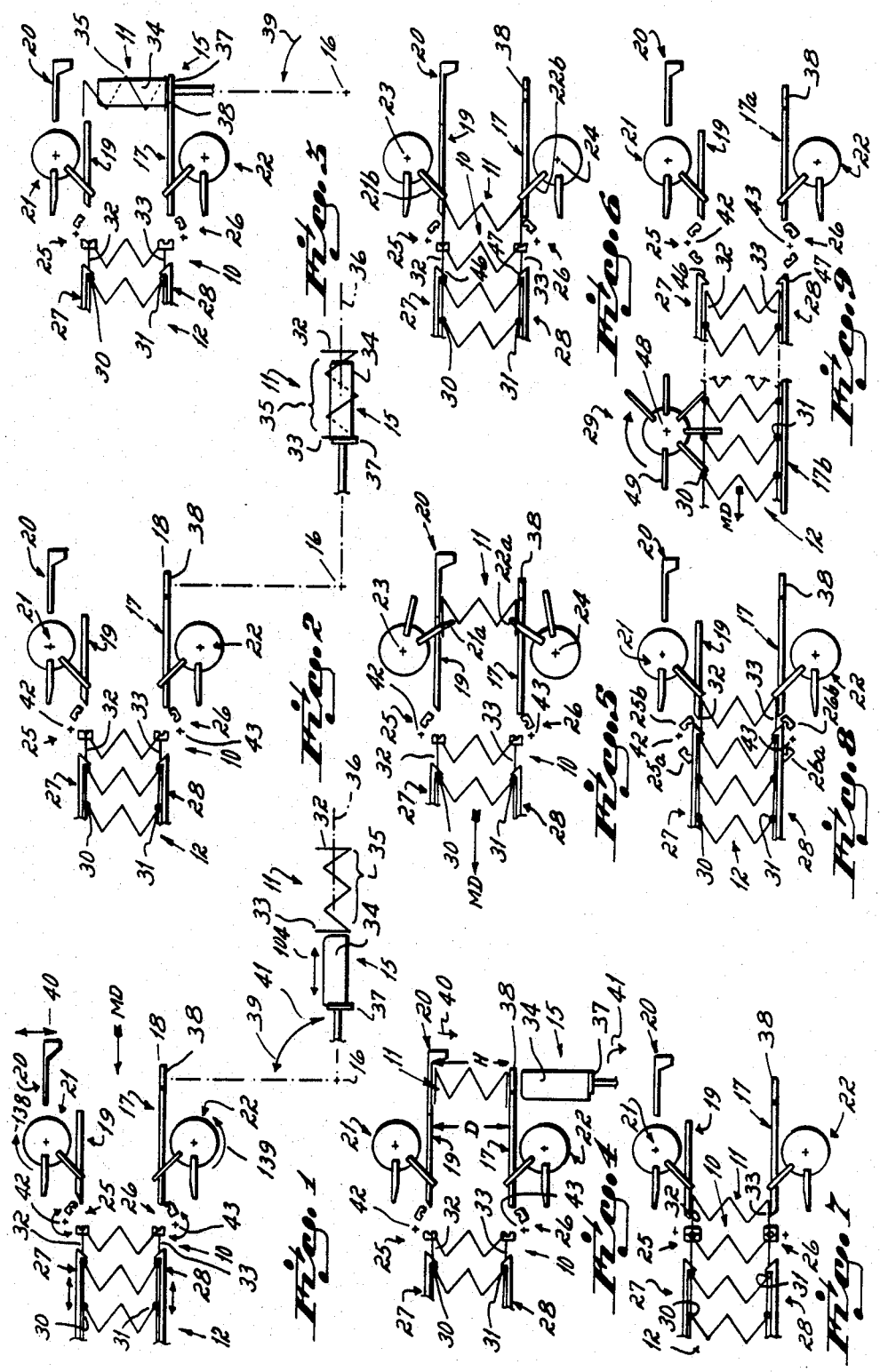

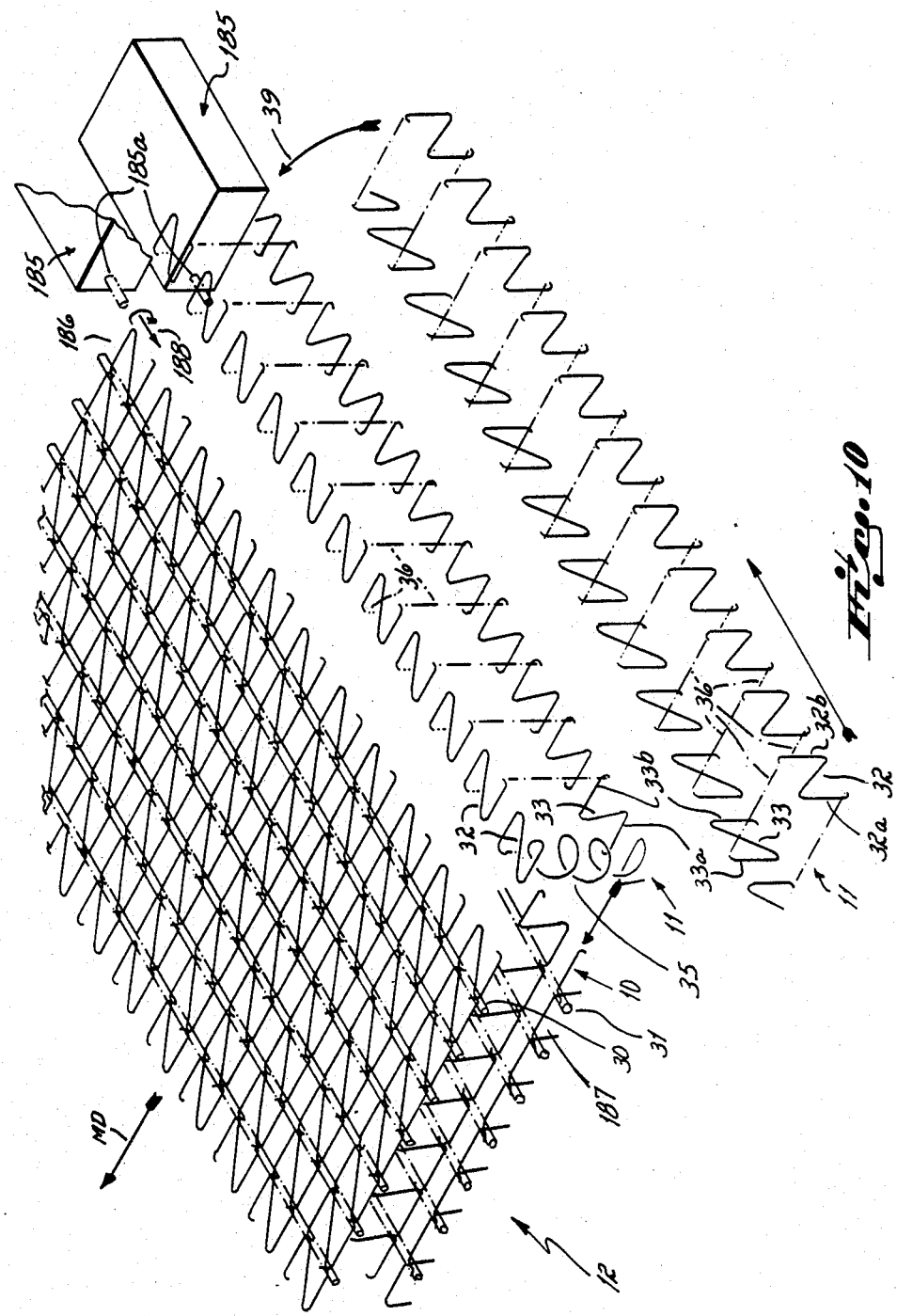

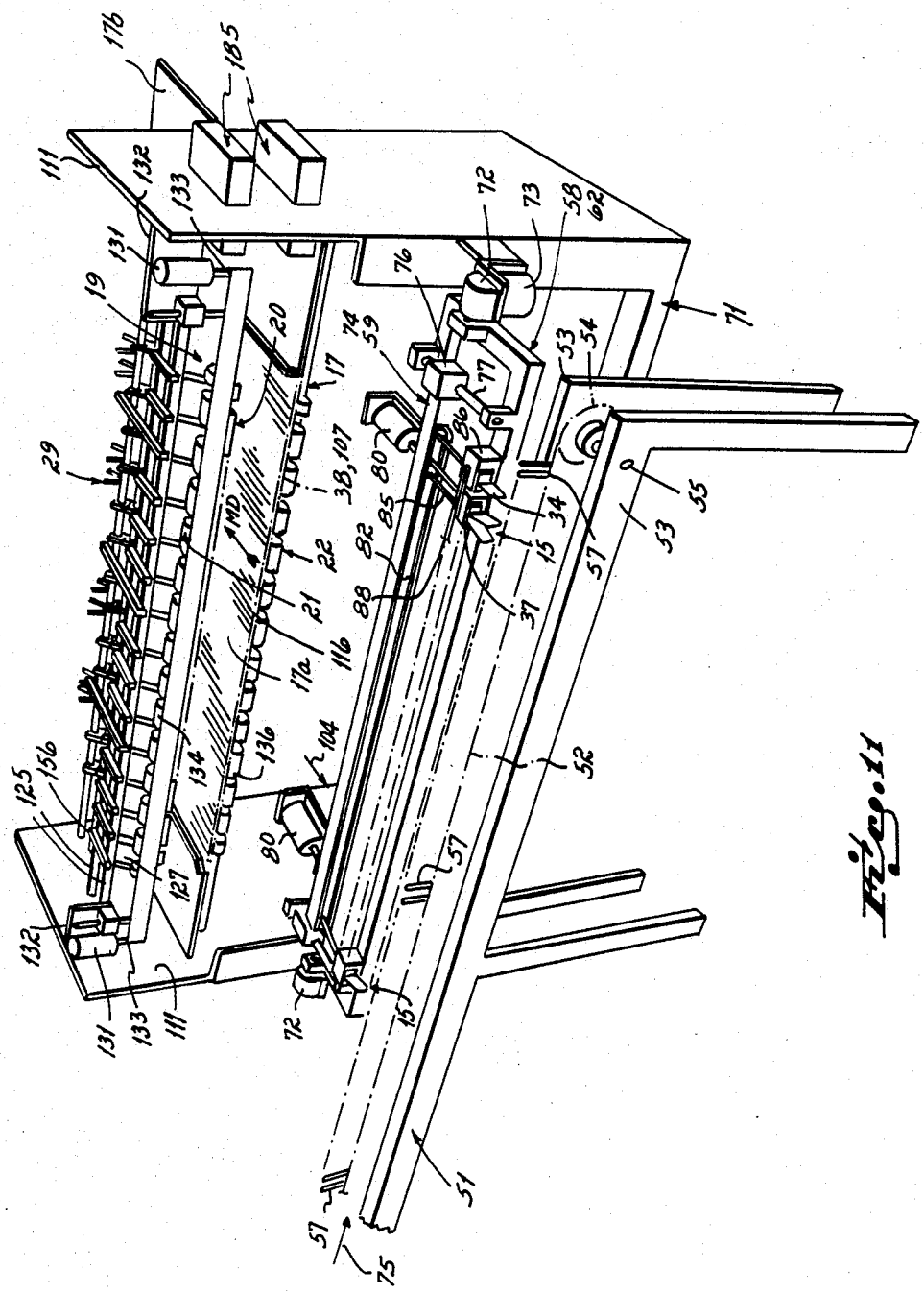

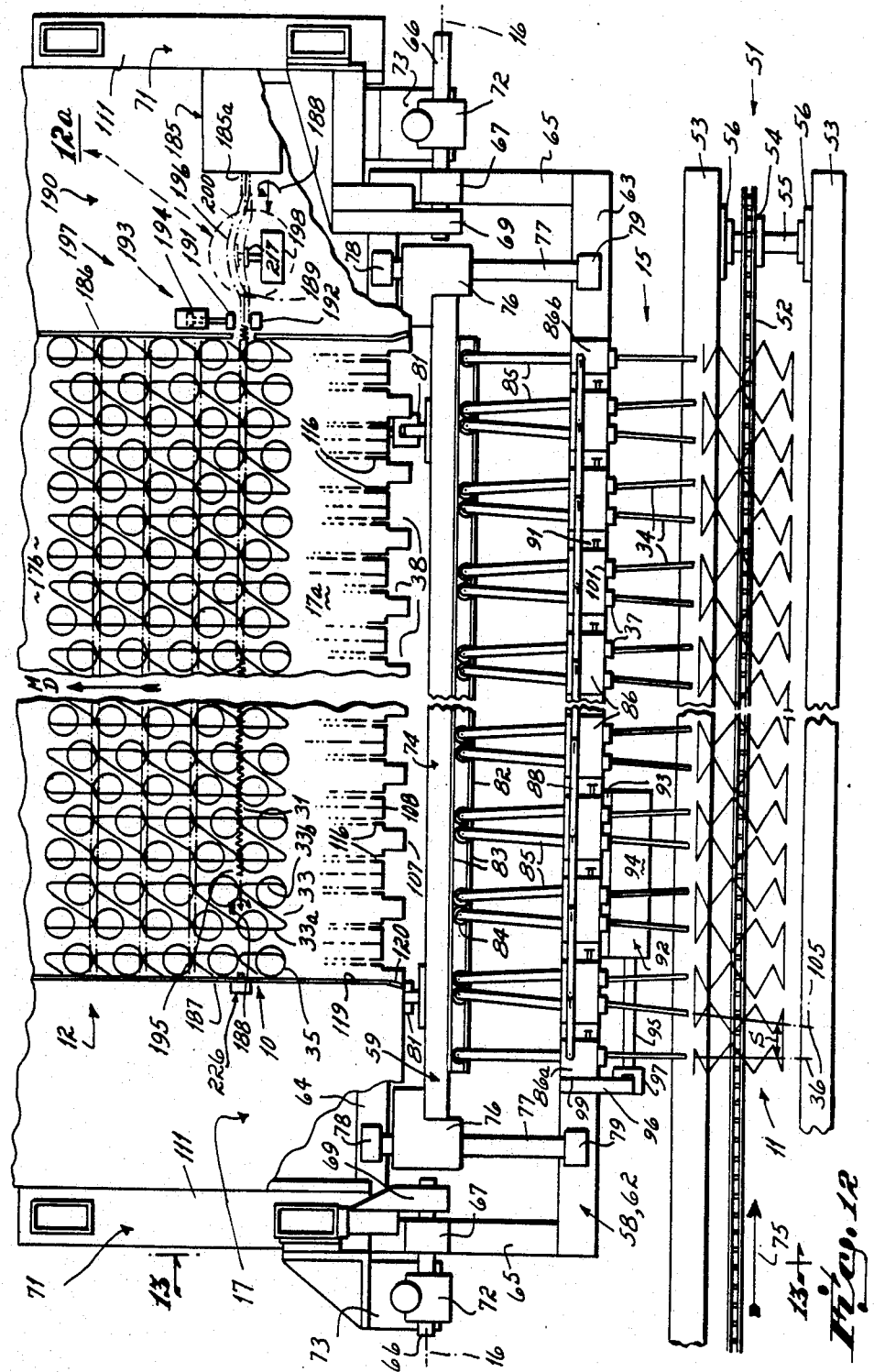

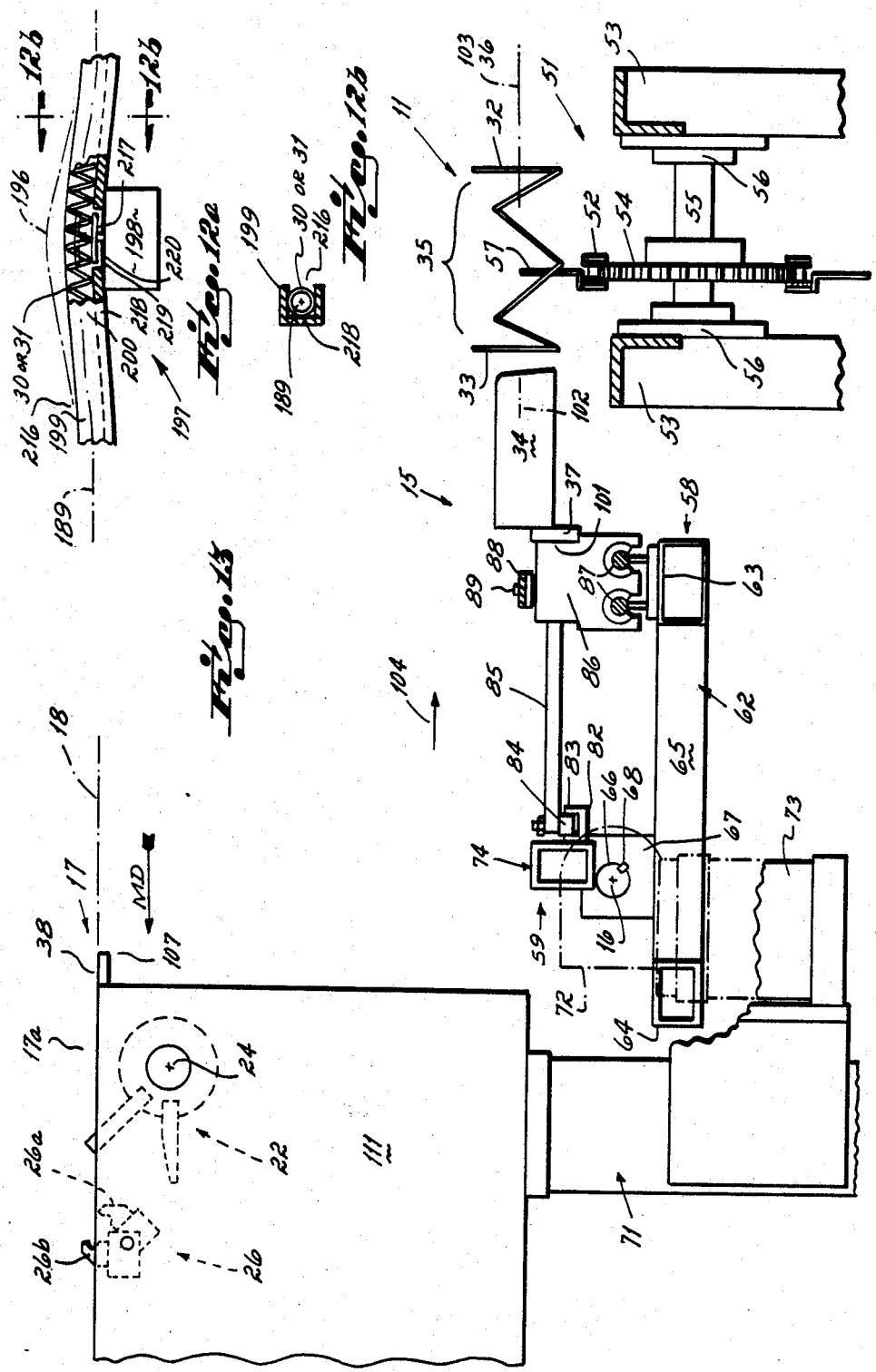

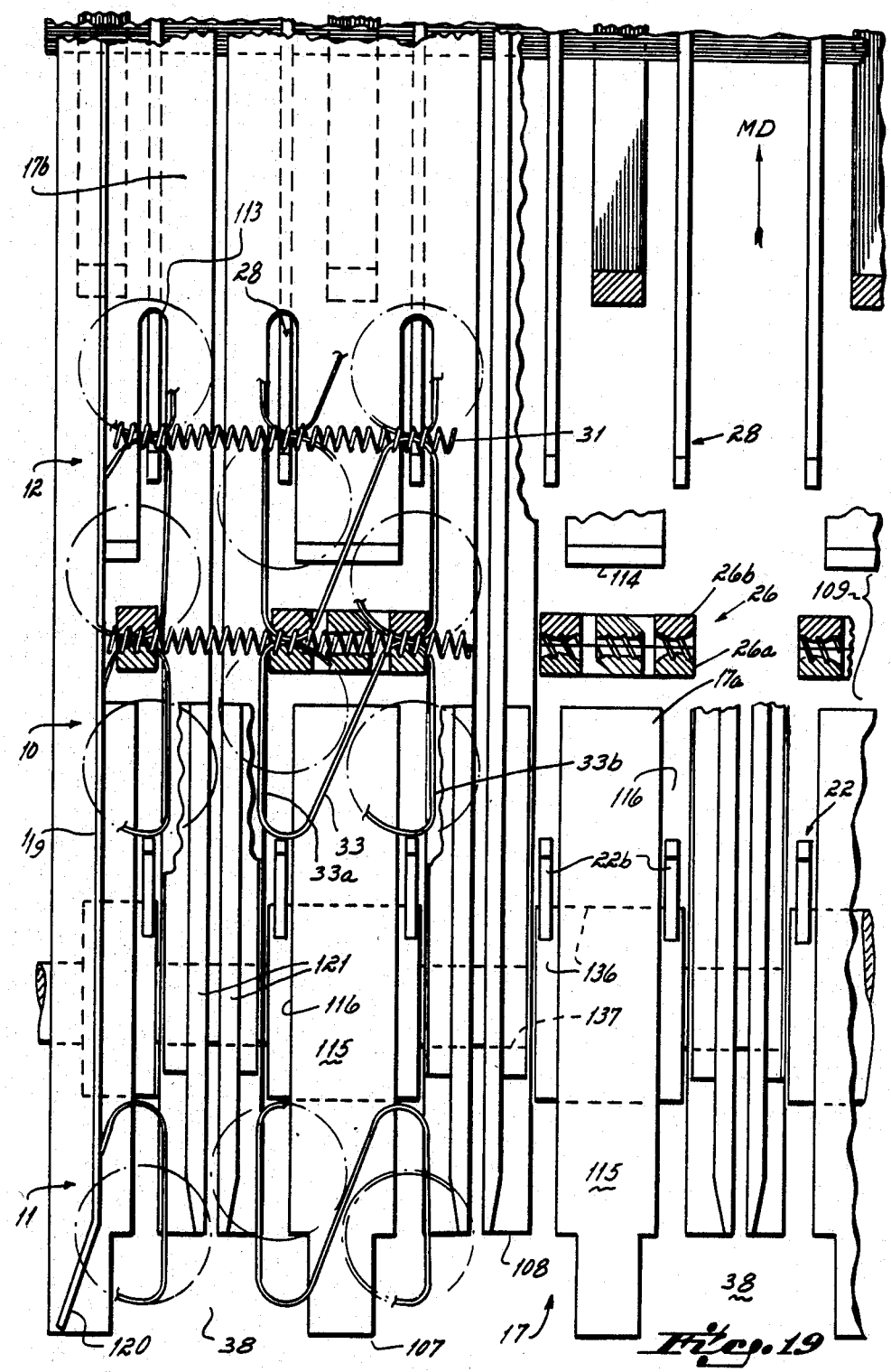

COIL SPRING ASSEMBLY MACHINE

This is a division, of application Ser. No. 300,995, filed Sept. 10, 1981, now U.S. Pat. No. 4,492,298 granted Jan. 8, 1985.

This invention relates to coil spring assemblies. More particularly, this invention relates to a machine for fabricating a coil spring assembly.

A coil spring assembly, as is well known to the prior art, is fabricated from a plurality of coil springs organized in matrix-like fashion into columns and rows. And it is generally the case that the coil spring assembly's spring rows are interconnected in both the top and bottom planes of the assembly. The springs are held in spatial relation relative one to the other, i.e., the rows and columns of the matrix are held in spatial relation, in the finished assembly by some type of fastener or tie that interconnects adjacent springs throughout the matrix one with the other. One type of row connector structure well known to the prior art is commonly known as a helical lacing wire. The helical lacing wire extends from one edge to the opposite edge of the spring assembly between adjacent rows of that assembly in one plane thereof, the lacing wire connecting adjacent springs within adjacent rows simply by being wound around the juxtaposed end loops of the adjacent springs. After fabrication of the coil spring assembly, manufacture of a finished product is completed by placing a cushion or pad of material, e.g., woven or non-woven batting, or foam rubber, or the like, over the top and/or bottom surface of the spring assembly matrix so formed, and then enclosing that structure with an upholstered fabric or cloth sheath or the like to provide a finished saleable product. One basic use of such coil spring assemblies is in the bedding industry where those assemblies find use as mattresses or box springs, but other uses are in the home finishing industry where the finished coil spring assembly may be used in a chair's seat or a chair's backrest or the like.

Generally in prior art coil spring assemblies, the spring coils within each coil row are initially separate one from the other. The disclosure of U.S. Pat. No. 3,469,608 is typical of known prior art coil springs of the individual type, and spring rows made up of individual coil springs are hereinafter referred to as separate coil spring rows. But it is also known to the prior art to make up a row of coil springs from a single continuous length of wire, and spring rows so fabricated are hereinafter referred to as continuous spring rows. In this latter continuous coil spring row structure, adjacent coils in the row are connected by a connector section or loop of wire disposed in either the row's top plane or bottom plane, but not in both the top and bottom planes. This latter type of single continuous length wire row of coil springs is illustrated, for example, in Adams et al U.S. Pat. No. 4,112,726. In any event, however, in the machine manufacture of a coil spring assembly the adjacent rows of coil springs, whether those springs are separate one from the other within each row or are integrated one with the other because all the coils of the row are produced from a continuous length of wire, must be initially juxtaposed and thereafter connected one to the other.

Assembly machines are known to the prior art by which a series of individual coil springs in a row of such springs are automatically positioned and connected with a juxtaposed row of identical individual coil springs through use of spiral lacing wire so as to form a coil spring assembly with adjacent spring rows connected one with the other. These machines have been relatively complex with numerous moving parts. Such complex machinery, particularly as complex as is required to locate and interconnect adjacent spring rows in the fabrication of a coil spring assembly by means of spiral lacing techniques, generally requires significant repairs and maintenance attention and this, in turn, causes substantial machine downtime. Of course, the cost of maintenance and the cost of machine downtime must be reflected in the manufacturer's cost of the final coil spring product. A reduction in machine maintenance would result in a reduction of machine downtime and this, in turn, would reduce a manufacturer's cost. Furthermore, to the best of applicants' knowledge no automatic assembly machine is known for assemblying juxtaposed rows of coil springs of the type where each spring row is produced from a single continuous length of wire, such as is shown in Adams et al U.S. Pat. No. 4,112,726. One of the primary advantages of a coil spring row formed from a single continuous length of spring wire is that the row may be efficiently and economically fabricated through use of machine techniques as is shown and described in the previously referred to patent. However, the advantages created in the manufacture of the coil spring row formed from a single continuous length of spring wire are substantially lost in assembly of such coil spring rows into a finished coil spring assembly in the absence of an automatic assembly machine to fabricate a spring assembly from continuous length wire coil spring rows.

Therefore, it has been one objective of this invention to provide an improved machine for assemblying rows of coil springs, that machine being less complex and of simpler structure than coil spring assembly machines for individual coil springs as known to the prior art, thereby providing an improved machine at less cost which requires less maintenance and provides less machine downtime than coil spring assembly machines known to the prior art It has been another objective of this invention to provide an automatic machine for assemblying continuous coil spring rows.

In accord with the objectives of this invention, and in preferred form, the machine of this invention for assemblying coil spring assemblies is operatively to initially pick up a row of coil springs by inserting pick up fingers within the spring's barrel and moving the spring through a 90° arc onto a support platen. The row of springs are then compressed against the support platen to a desired height through use of a reciprocable compression bar. Thereafter, and through use of rotatable transfer fingers of a transfer shaft, the springs are first engaged by leading transfer fingers and pulled out from under the compression bar. Thereafter the springs are engaged by other transfer fingers of the transfer shaft and then pushed into the downstream one of a pair of clamping dies. Assuming a leading row of coil springs already to be present in the clamping dies, the clamping dies clamp together the upper and lower end loops of the leading and trailing coil springs. The rows of clamped springs are then connected together by helical lacing wires. After the coil spring rows are connected, upper and lower indexing hooks grab the connected coils and index same in the machine's downstream direction so as to permit a next trailing row of springs to be fed into the clamping dies and connected to the assembly. When the desired number of rows of springs have been connected, a feed-out mechanism is cycled to move the completed spring assembly away from the machine's clamping dies and indexing hook station.

One novel feature of this machine is predicated upon the transfer apparatus including the pick up fingers for picking up a row of coil springs, rotating them through a 90° arc, and placing them onto the support platen. Transfer machines are known to the prior art for engaging a row of coil springs and moving them onto a support platen of an assembly machine. Such a transfer machine is disclosed in U.S. Pat. No. 4,162,732. However, the transfer machine of this prior art patent has numerous disadvantages not characteristic of the transfer machine of this invention. Specifically, that transfer machine is operative to grasp the end loop of coil springs and then effect movement of the coil springs to the transfer platen. However, such grasping movement of the end loops requires that those end loops be accurately positioned relative to the pick-up fingers and that they be accurately sized, etc. It is often difficult to so position end loops of a coil spring so that they will always be in the same position for pick-up by the transfer machine and in the case of continuous coil springs it is even more difficult because the coils are usually manufactured from a very thin wire and are very flimsy and difficult to position from one row of coils to the next. The transfer apparatus of this assembly machine, by entering the barrel of the springs rather than grasping the end loop, does not require such accurate positioning of the coils in order to enable the coils to always be engaged and picked up by the transfer fingers. Consequently, there are fewer missed springs by the pick-up fingers and less down time of the machine correcting for the misssed springs.

Still another novel aspect of this assembly machine is predicated upon the use of rotatable transfer fingers of a transfer shaft for effecting indexing movement of the springs through the assembly machine. In the preferred embodiment, the transfer shaft has a pair of transfer fingers extending radially from it and engageable with each of the coils of a row of coils. This shaft rotates through one full revolution to effect one indexing move of a row of coils through the machine. The leading one of each of these pairs of transfer fingers is operable to engage an end loop of a coil and to pull it forward through a portion of the indexing movement of the coil. The trailing finger then engages the coil and pushes it forwardly away from the leading finger and into the clamping die where the trailing finger functions as a back-up to prevent the coil from moving relative to the die as it is clamped between the dies.

Prior to this invention, coils have generally been indexed within an assembly machine by either a reciprocating straight line mechanism or by a four stroke disappearing pusher finger mechanism. The four stroke is operative to raise, push the coil forward, drop down out of engagement from the coil, and move back to its starting position. The disadvantage of the straight line mechanism is that it is subject to wear and to distortions of the coil spring. The disadvantages of the old four stroke pusher mechanism is that it is more complex than the rotatable mechanism of this invention. Additionally, the rotatable mechanism of this invention provides better control of the coil feed than do the prior art mechanism. Furthermore, initial positioning of the coil for engagement by the advancing mechanism is not as critical with this invention as it is with the prior art mechanism.

Furthermore, the second pusher finger of this mechanism is operative to move the coils forwardly out of engagement with the leading pulling finger so as to prevent that leading finger from pulling the leading edge of the coil downwardly as that finger disengages from the coil. Furthermore, the second finger acts as a stop or back-up for the coil while it is clamped between the clamping dies so that there is no tendency for the coil to bounce or rebound out of the clamping dies.

Still another novel feature of this assembly machine is predicated upon the clamping dies for clamping the end loops of two coils together while they are interconnected by a helical lacing wire. According to the practice of this novel feature, these clamping dies are in the form of a pair of dies pivoted in a scissors style about a common pivot. The downstream one of these pairs of dies is closed or raised and the upstream die lowered or opened as a coil is fed into the dies. Thereafter, the upstream die is pivoted into a closed position so as to clamp the end loops of the coils between the two dies while the helical lacing wire is wrapped about them. After the coils have been laced together, both dies are pivoted to an open position and the laced coils are indexed forwardly without any interference between the coils and the dies. The downstream die is then closed or raised while the upstream die remains open for reception of the next following coil.

In the past, it has been a common practice to utilize a single pivoted die engageable with a stationary die or with a die which is vertically movable to effect clamping of the coils during the lacing process. U.S. Pat. Nos. 2,026,276; 3,339,593; 3,516,451 and 2,414,372 typify this type of prior art clamping die construction.

The advantage of this dual scissors style pivoted dies of this assembly machine over the prior art single pivoted die is that it effects better location of the coils, increased reliability of the machine, and a stronger clamping action with a mechanism which is simpler and less complex than prior art mechanisms. Additionally, this mechanism has the advantage that it does not in any way interfere with indexing of the connected coils or loading of the interconnected coils into the die. Furthermore, both dies cooperate in the accurate positioning of the coils within the dies.

Still another novel feature of the machine is predicated upon the use of a multiple finger star wheel for feeding completed units out of the machine. This feeding mechanism is operative to move through 360° of rotation after the last row has been assembled so as to move a completed assembly out of the machine and out of a position in which the completed assembly interferes with the following coil spring unit.

Still another novel feature of this assembly machine is predicated upon the mechanism for monitoring the applications of the helical lacing wires while it is lacing together two rows of clamped coils. This improved mechanism includes a very sensitive stop mechanism operative to stop the helical lacing machine in the event that the wire encounters an obstacle in the course of being wound onto a series of coils. It also includes a clamp, operative to grip the loose end of the helical lacing wire adjacent to the coil spring unit before it is cut off.

The improved torque responsive stop mechanism comprises a proximity switch located adjacent to a bowed section of guide elements. This switch is actuated by movement of the bowed or axially deformed helical lacing wire away from the switch in the event that the lacing wire encounters an obstacle in the course of moving through the clamping dies and around the juxtapositioned end loops of the coils. Actuation of this proximity switch triggers a clutch and brake mechanism to stop the helical lacing wire until the obstacle is removed or corrected.

The lacing wire clamp is operative to clamp the end of the helical lacing wire prior to cut-off so that after cut-off, the loose end of the coil spring does not spring forward as a consequence of built-up torque and into the assembled unit.

The advantages of the lacing wire mechanism is that it is more sensitive to obstructions to the lacing wire and therefore more quickly responsive to those obstructions than is the prior art. As for example, the torque responsive stop mechanism of U.S. Pat. No. 3,451,443. Furthermore, this mechanism is less complex and more easily installed than is the prior art torque responsive stop mechanism.

Another advantage of this lacing wire mechanism is that it eliminates a common problem which has heretofore been characteristic of prior art lacing mechanisms. Heretofore, whenever a lacing wire was cut off after being wound through a row of coil springs, the built up torque in the remainder of unlaced but coiled wire, caused that unlaced wire to spring forward after cut off into the assembled coil spring unit where it often caused a jam when the assembled coil spring unit were subsequently indexed forward. The lacing wire clamp of this invention eliminates this jam problem.

Other objectives and advantages of this invention will be more apparent from the following detailed description taken in conjunction with the drawings in which:

FIG. 1 is a side diagrammatic view of a machine in accord with the principles of this invention, the machine being illustrated with a coil spring assembly partially formed, and with the machine in the ready position prior to commencing an assembly cycle;

FIG. 2 is a view similar to FIG. 1 illustrating a first step in the assembly cycle at which the machine's pick up fingers are initially inserted into a trailing coil spring's barrel at an in-feed location;

FIG. 3 is a view similar to FIG. 2 showing the next step in the assembly cycle at which the trailing coil spring has been moved from the in-feed location to a preliminary location on the machine's support platen;

FIG. 4 is a view similar to FIG. 3 illustrating the next step in the assembly cycle at which the pick up finger is withdrawn and a compression bar is lowered for height sizing of the trailing coil spring;

FIG. 5 is a view similar to FIG. 4 illustrating the following step in the assembly cycle at which the trailing coil spring has been pulled from beneath the compression bar and directed between a sizing platen and the support platen by the spring advancing mechanism;

FIG. 6 is a view similar to FIG. 5 but illustrating the trailing coil spring being pushed into juxtaposed proximity with a leading coil spring by the spring advancing mechanism;

FIG. 7 is a view similar to FIG. 6 illustrating the next step in the assembly cycle at which the leading and trailing coil springs have been clamped together by clamping dies while the end loops of the juxtaposed springs are laced together;

FIG. 8 is a view similar to FIG. 7 showing the following and last step in the assembly cycle at which indexing hooks are extended for gripping the coil spring assembly, the cycling of the machine returning to the FIG. 1 position until a completed assembly is made;

FIG. 9 is a view following the sequence of FIG. 8 and illustrating the operation of a feed out mechanism after a coil spring assembly has been completed;

FIG. 10 is a diagrammatic perspective view of several continuous spring rows laced together by the machine of this invention, a trailing coil row being shown in two of its positions prior to being juxtaposed with the leading coil row;

FIG. 11 is a perspective view of a machine structured in accord with the principles of this invention;

FIG. 12 is a plan view of the support platen of the machine shown in FIG. 11, and is a view in more detail taken along line 12—12 of FIG. 1;

FIG. 12A is an enlarged and more detailed view of the encircled area of FIG. 12;

FIG. 12B is a cross sectional view taken on line 12B—12B of FIG. 12A;

FIG. 13 is a cross-sectional view taken generally along line 13—13 of FIG. 12;

FIG. 19 is a plan view taken generally along lines 19—19 of FIG. 18, the dies being shown in cross-section for clarity.

GENERAL MACHINE STRUCTURE AND OPERATION

Figure 14:
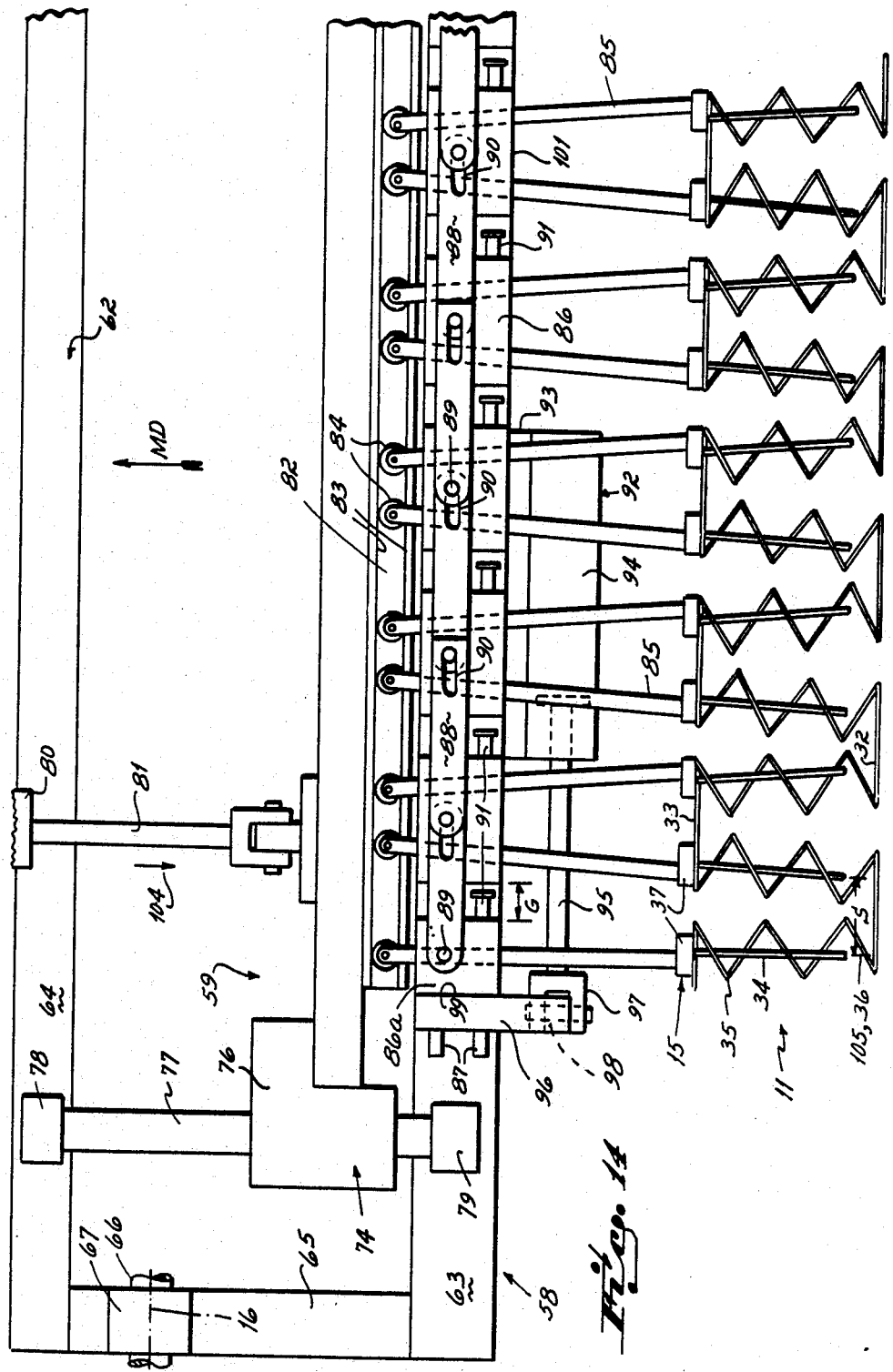
FIG. 14 is a fragmentary view similar to a portion of FIG. 12, but is enlarged and illustrates the pick up fingers in the initial extended position where same are received in the coil springs' barrels.

The basic structure and function of the machine of this invention, is illustrated in FIGS. 1-10 in diagrammatic form. The structure and operation of the machine shown in those figures is illustrated in connection with leading 10 and trailing 11 coil rows and an assembly 12. It should be understood that each of the coils shown represents a row of such coils. Each row of coils may comprise individual or separate coil springs (not shown), or may be (as shown in FIG. 10) a continuous spring row manufactured by the machine and method shown in Adams et al U.S. Pat. No. 4,112,726. Indeed, it is continuous spring row with which the machine, in operation thereof, is more particularly disclosed in subsequent FIGS. 11-19.

The basic components of the machine include pick up finger 15 pivotable through a 90° arc on pivot axis 16, and a support platen 17 which defines a horizontal spring support plane 18. A sizing platen 19 is located parallel to and above the support platen 17. A compression bar 20 is vertically reciprocable relative to the support plane 18. Upper 21 and lower 22 transfer fingers rotatable on upper 23 and lower 24 transfer axes cooperates with compression bar 20 and platens 17, 19. Upper 25 and lower 26 clamping dies, upper 27 and lower 28 indexing hooks, and a feed-out mechanism 29 (see FIG. 9) also cooperate with the platen 17, 19.

The machine is in the cycle start position as shown in FIG. 1 with a leading spring 10 previously connected to downstream connected springs 14 by upper 30 and lower 31 spiral lacings, the machine direction of the springs and spring assembly through the machine being illustrated by arrow MD. In this cycle ready position, and as also shown in FIG. 1, the compression bar 20 is in its retracted or upper position and the rear dies 25b, 26b of the upper and lower dies 25, 26 are in their active position. In this active position, the rear dies 25b, 26b function as stops so as to position the leading spring 10 in the desired lacing position relative to the trailing coil 11 to be subsequently received in juxtaposed relation with that leading coil within the dies 25, 26. Further, in this cycle ready position note that the indexing hooks 27, 28 are in a retracted position at which same grip the previously laced upper and lower connections between the leading spring 10 and the downstream connected spring 12. This interconnection of the upper 27 and lower 28 indexing hooks with the coil spring assembly 12 insures that the upper and lower loops 32, 33 of the leading spring 10 are drawn taught against and properly positioned within the rear dies 25b, 26b of the upper and lower dies 25, 26.

With the machine in the cycle start position as shown in FIG. 1, the initial machine step is to extend the pick up finger 15 from the retracted FIG. 1 position into the extended FIG. 2 position. In the pick up finger's extended FIG. 2 position, the pick up finger 15, which is in the form of a narrow blade 34, is received and positioned within barrel 35 of a trailing coil spring 11 in that spring's pick up or infeed position. Note this initial pick up or infeed position of trailing spring 11 is with its spring axis 36 disposed parallel to the support platen's plane 18. After the pick up finger 15 is received within the coil spring's barrel 35 as shown in FIG. 2, the pick up finger 15 is pivoted through a 90° arc (as shown by arrow 39) about its pivot axis 16 until the pick up finger's base 37 is located near a recessed seat 38 defined in the support platen as shown in FIG. 3. In this FIG. 3 position, the coil spring's axis 36 is oriented perpendicular to the support platen s plane 18, and the trailing spring 11 is seated on that support platen. As the coil spring 11 is moved between the FIG. 2 and FIG. 3 positions, the distance between successive coil springs in a coil spring row (not shown in FIGS. 1-9) can be shortened or otherwise varied if desired through use of primary and secondary carriages (not shown in FIGS. 1-9, but shown in subsequent figures) to which the pick up fingers 15 are connected.

Once the trailing coil spring 11 is in the FIG. 3 position where it is seated on the support platen 17, and while pick up finger 15 still remains therein as shown in FIG. 3, the compression bar 20 is extended (as shown by arrow 40) in a direction normal to the support platen's plane 18 into compressive relation with the top loop 32 of the coil spring. The full extended position of the compression bar 20, which is shown in FIG. 4, is such that the height H of the coil spring is established at a predetermined and desired height, which height if no greater than the distance D between the sizing platen 19 and the support platen 17. After the compression bar 20 has been lowered, the pick up finger 15 is withdrawn from the coil spring's barrel 35 so that the coil spring is, in effect, restrained in position on the support platen 17 by the compression bar. In this regard, therefore, note that the compression bar 20 is upstream of the sizing platen 19 relative to machine direction MD as shown in the figures, and that the compression bar overlies the support platen 17. With the compression bar 20 still in extended position relative to the trailing coil spring 11, and with the pick up finger 15 withdrawn from the spring's barrel (and pivoted back per direction arrow 41 to the pick up direction shown in FIGS. 1 and 2), the spring advancing mechanism 21, 22 is activated in the assembly cycle.

The spring advancing mechanism 21, 22 includes a top pair of transfer fingers 21 and a bottom pair of transfer fingers 22 for cooperation with the top end loop 32 and bottom end loop 33, respectively, of the trailing coil spring 11. These advancing fingers 21, 22 rotate on rotational axis 23, 24 positioned above and below, respectively, of the sizing platen 19 and support 17 platens in such a position that the fingers themselves extend through slots (not shown in FIGS. 1-9) in the sizing and support platens, respectively. As the transfer fingers 21, 22 are rotated from the FIG. 4 position to the FIG. 5 position, the leading transfer finger 21a, 22a of each pair initially moves into the coil spring's barrel 35 and engages the leading edge of the trailing coil spring's top 32 and bottom 33 loops, thereby pulling the coil spring in machine direction MD out from underneath the compression bar 20 and into an intermediate advanced position between the sizing platen 19 and the support platen 17. Subsequently, and as the transfer fingers continue to rotate from the FIG. 5 position to the FIG. 6 position, the trailing transfer finger 21b, 22b of each pair engages the trailing edge of the trailing spring's top and bottom loop 32, 33, thereby pushing the coil spring 11 in machine direction MD between the sizing platen 19 and the support platen 17 towards and into juxtaposition with the leading spring 10 already located within the clamping dies 25, 26. In other words, and as the trailing coil spring 11 is moved toward the FIG. 6 attitude from the FIG. 5 position, the trailing transfer fingers 21b, 22b push the coil spring toward the clamping dies 25, 26 until the leading edge of the trailing spring's top and bottom loops 32, 33 abut against the top and bottom rear dies 25b, 26b as shown in FIG. 6. This initial pulling and subsequent pushing of the trailing coil spring 11 from beneath the compression bar 20, between the sizing platen 19 and support platen 17, and into juxtaposed relation with the leading coil spring 10 at the clamping dies 25, 26, insures that the trailing spring 11 will be firmly and positively advanced into the upper and lower clamping dies.

When the trailing spring 11 has been juxtaposed to the leading spring 10 as shown in FIG. 6 by the advancing mechanism 21, 22, the upper and lower clamping dies' front dies 25a, 26a rotate on upper 42 and lower 43 dies axes into clamping relation with the respective rear dies 25b, 26b. In this clamping position, which is shown in FIG. 7, the upper 25 and lower 26 clamping dies are closed, thereby properly positioning and clamping together the juxtaposed end loops 32, 33 of the leading 10 and trailing 11 coil springs. In this die closed position, the end loops 32, 33 of the juxtaposed leading 10 and trailing 11 coil springs are laced together by a spiral lacing wire 30, 31 (see FIG. 10) so as to connect or tie the leading spring to the trailing spring. Note as shown in FIG. 7 that, during the lacing step, upper 27 and lower 28 indexing hooks remain retracted and interengaged with the previously laced upper 30 and lower 31 connections between the leading spring 10 and the coil spring immediately downstream therefrom.

After the leading coil spring 10 and trailing coil spring 11 have been laced together with the spiral lacing wires, thereby connecting the two springs together, both dies 25a, 25b & 26a, 26b of the upper 25 and lower 26 clamping dies pivot out of clamping relation with those springs on upper 42 and lower 43 die axes. This, in effect, removes both dies of each of the upper 25 and lower 26 clamping dies from the space between the sizing platen 19 and the support platen 17 so as to permit the assembled coil spring 12 to be indexed in the machine direction. This indexing of the coil spring assembly in the machine direction MD is achieved by extending the indexing hooks 27, 28 into hooked relation with the spiral lacing wire connections 30, 31 that has just joined the leading 10 and trailing 11 springs as shown in FIG. 8. In this extended attitude, the indexing hooks 27, 28 simply grab the lacing wire 30, 31 and/or the spring's end loops 32, 33. The indexing hooks 27, 28 are thereafter retracted in the machine direction MD from the FIG. 8 extended position back into the FIG. 1 retracted position. As the indexing hooks are retracted, and prior to achieving the full retracted position shown in FIG. 1, the rear dies 25b, 26b of each of the upper 25 and lower 26 clamping dies is pivoted on its respective axis 42, 43 back into the stop or closed position shown in FIG. 1. In this subsequent position, and as noted in connection with FIG. 1, the upper 25b and lower 26b rear dies cooperate with the indexing hooks 27, 28 to properly position the end loops of the new leading spring (which was the previous trailing spring 11) in that position shown in FIG. 1 preparatory to receiving a new or subsequent trailing spring. With regard to the indexing hooks 27, 28, note that the trailing edges 46, 47 of each is, in effect, a cam edge so as to permit the hooks to extend beyond the laced connection 30b, 31b, i.e., upstream of that laced connection, where it is moved from the retracted FIG. 7 position to the extended FIG. 8 position, without catching on the lacing wires 30, 31 or the coil springs' end loops 32, 33.

After the desired number of coil springs have been laced together in the coil spring assembly 12 to be fabricated, and as shown in FIG. 9, the machine's upper 25 and lower 26 clamping dies are both retracted or pivoted into the unactive position. The feed-out mechanism, which is in the form of a feed-out wheel 29 is then rotated or cycled on axis 48 through a single revolution. While the feed-out wheel 29 is rotated, the successive fingers 49 on the wheel 29 enter the barrels 35 of successive coil springs in the coil spring assembly 13, thereby causing the coil spring assembly to move in the machine direction MD away from the clamping dies 25, 26 and away from the indexing hooks 27, 28. This feed-out wheel 29, therefore, cycles only after a full coil spring assembly 12 has been completed so as to at least partially remove that spring assembly from the machine by sliding it along support platen 17. This, in turn, makes final removal of the coil spring assembly from the machine easy for an operator, and also insures that the clamping dies 25, 26 and indexing hooks 27, 28 areas of the machine are cleared preparatory to commencing the operation sequence for fabricating another coil spring assembly.

Specific Machine Structure and Operation

Transport Mechanism

The transport mechanism of the machine is particularly illustrated in FIGS. 11–15. The transport mechanism is comprised of a series of the pick up fingers 15, eighteen being shown, each of which cooperates with an individual coil of a row 11 of coil springs presented to the machine by an in-feed conveyor 51 at an in-feed or first location. Note particularly the coil spring row 11 is a continuous spring row in that the row of coil springs is made from a continuous length of spring wire, but within this row there are provided a series of coil springs each of which defines the spring's axis 36. It is, of course, the function of the pick up fingers 15 to transport the coil spring row 11 from the in-feed location where it is initially positioned by the in-feed conveyor 51 through a 90° arc onto the machine's support platen 17, note FIGS. 1–4 of the sequence as described above.

The in-feed conveyor 51 is of an endless chain 52 type that includes opposed side frames 53. The downstream end of the in-feed conveyor shown in FIG. 13 is comprised of a chain sprocket 54 fixed on axle 55, the axle being carried on bearings 56 mounted on the side frames and being driven by a motor (not shown). The conveyor chain 52 is provided with coil lugs 57 (see FIG. 13) fixed thereto, the coil lugs being structured to receive the continuous spring row 11 in connection relation therewith. It is contemplated in practice that the in-feed conveyor 51 interconnects the machine of this invention with a machine as described in Adams et al U.S. Pat. No. 4,112,726, the machine shown in that patent being for the purpose of forming the row 11 of coil springs from a continuous length of wire.

The pick up fingers 15 of the transfer mechanism ar mounted on a primary carriage 58 for pivotal motion on pivot axis 16 between the pick up position and the release position (compare FIGS. 13 and 16), and the pick up fingers are also mounted on a secondary carriage 59 for movement between a retracted position (shown in FIG. 12) and an extended position (shown in FIG. 14), the secondary carriage 59 being connected to and movable with (and, in effect, therefore mounted on) the primary carriage 58. In other words, and since the primary 58 and secondary 59 carriages are connected one with the other, both carriages pivot between the in-feed position shown in FIGS. 1, 2 and 13 and the release position shown in FIGS. 3 and 16.

The primary carriage 58 includes a primary carriage frame 62 having front 63 and rear 64 rails and side rails 65 all fixed together in a rigid structure. At each side of carriage frame 62, a frame swing shaft 66 is keyed to a frame block 67 as at 68, see FIGS. 12 & 13. The frame shafts 66, at their inner ends, are each carried in a bearing (not shown) mounted on a support arm 69 fixed to main machine frame 71. The frame shafts 66, at their outer ends, are each keyed to a gear box 72. The gear box gears not shown) are driven by motors 73 so as to pivot the carriage's swing shafts 66 (and, therefore, the primary carriage 58) between the position shown in FIGS. 2 and 13, and the position shown in FIG. 3 and 16.

The secondary carriage 59 includes a secondary carriage frame 74 disposed parallel to in-feed path 75 of the in-feed conveyor 51. This secondary frame 59 is fixed to carriage blocks 76 at each end, the carriage blocks being carried on guide ways 77 oriented normal to the in-feed path 75. The guide ways 77 are each fixed at the rear end 78 to the primary carriage's rear frame rail 64 and at the front end 79 to the primary carriage's front frame rail 63. The secondary frame 59 is movable on the guide ways 77 through use of spaced fluid motors 80 each of which is connected to that frame 59 by a piston rod 81, compare FIGS. 12 & 14. The secondary carriage 59 also includes a roller rail 82 fixed to the secondary frame 74, the roller rail also extending parallel to the in-feed path 75 of the in-feed conveyor 51. The roller rail 82 includes opposed flanges 83 that capture a roller 84 connected to each pick up finger 15. Each pick up finger 15 includes the blade 34 at the front end thereof, the blade being generally flat and sized to be received within a coil spring's barrel 35, see FIG. 14. This blade 34 is attached to a finger base 37 against which the coil spring's end loop 33 is abutted to properly position the pick up finger's blade within the coil spring's barrel 35. The finger base 37 is fixed to a motion shaft 85 which extends rearwardly, i.e., in the opposite direction of, the pick up finger's blade, the motion shaft being slidably received in finger guide block 86 mounted on the primary carriage frame's front frame rail 63. The roller 84 carried on the motion shafts 85 at the rearend thereof are captured between flanges 83 of the secondary carriage's roller rail 82 as previously mentioned.

Figure 15:
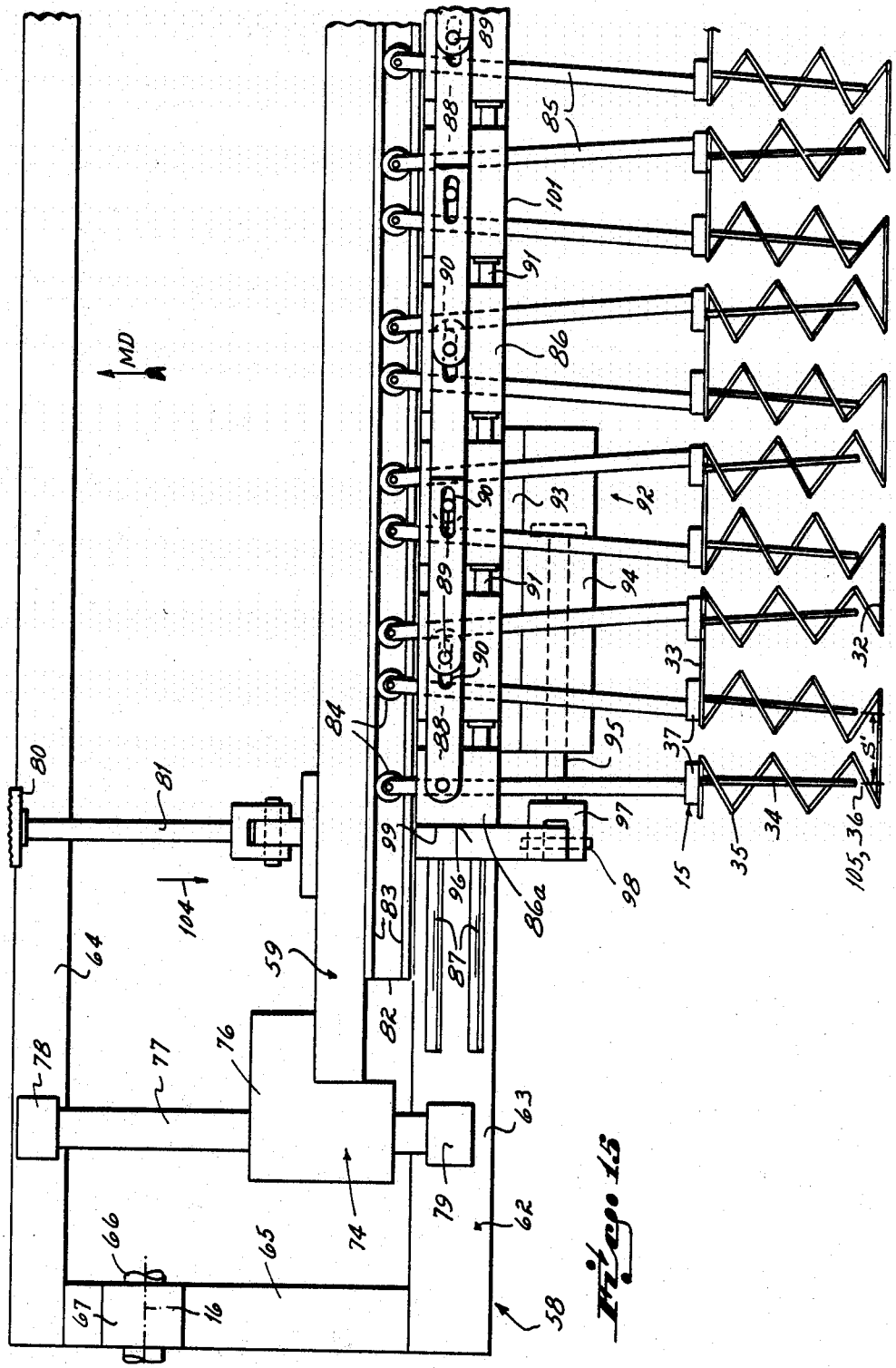
FIG. 15 is a view similar to FIG. 14, but shows the pick up fingers moved relative one to another so as to change the gap between the center lines of successive coil springs.

The guide block 86 for each pick up finger 15 is mounted on guide ways 87 disposed parallel to the continuous spring row's in-feed path 75, see FIG. 13. These guide ways 87 are mounted on the primary carriage's front rail 63. All guide blocks 86 are adapted to cooperate with two pick up fingers 15 except for the end guide blocks 86a, 86b. The end guide blocks 86a, 86b cooperate with only a single pick up finger 15. Further, it is important to note that all of the finger guide blocks 86 are movable or slidable on the guide ways 87 except for the last guide block 86, i.e., the most downstream guide block relative to the machine direction 75 of the in-feed conveyor 51. This last guide block 86b is fixed or immobily mounted to the front rail 63 of the primary carriage frame 58. As best seen in FIGS. 13-15, all of the blocks 86 are serially connected one with another by spacer limitation links 88. Each block 86 pivotably mounts, by way of a pin 89, the upstream end of a link 88 (relative to in-feed direction 75). The downstream end of each link 88 is slotted as at 90 to slidingly receive the next adjacent downstream pin 89. Thus connected, the upstream block 86a has one link 88 slidably mounted thereto and all intermediate blocks 86 pivotally mount the upstream end of a link 88 and slidably secure the downstream end of a link. Each finger guide block 86 except the last one 86b also carries a spacer stop 91 on the downstream side (relative to the in-feed direction 75) of that guide block. The operation of the spacer limitation links 88 and spacer stops 91 is described in greater particularity below.

The end finger guide block 86a is connected to the secondary carriage's fluid motor 92 which is fixed to the front rail 63 of the primary carriage's frame 62 by plate 93. This fluid motor 92 includes power cylinder 94 and piston rod 95, the piston rod being pivotally connected to arm 96 by yoke 97 and pin 98. The arm 96 is fixed to the upstream (relative to the machine direction 75 of the in-feed conveyor 51) face 99 of the first or upstream finger guide block 86a, thereby connecting all finger blocks with the secondary carriage's motor 92.

In operation of the transport mechanism, the initial or ready position of the mechanism is as illustrated in FIGS. 1, 12 & 13. As shown in those figures, the secondary carriage 59 is retracted relative to the primary carriage 58 so that the take up fingers' bases 37 abut front faces 101 of the finger guide blocks 86. Further, the primary carriage 58 is oriented so that the fingers 15 are adapted to extend in a generally horizontal plane 102 which is generally co-planar with the plane 103 defined by the springs' axes 36 in the continuous spring row 11 as delivered to the in-feed location by the in-feed conveyor 51, see FIG. 13. With the continuous spring row 11 positioned as shown in FIGS. 1, 12 & 13, the secondary carriage's fluid motors 80 are energized so that the motors' piston rods 81 force the secondary carriage's frame 74 toward the in-feed conveyor's machine direction path 75 in a direction generally normal thereto as shown by arrow 104. This causes the pick up fingers 15 to be moved into the extended position shown in FIGS. 2 & 14 from the retracted position shown in FIGS. 1, 12 & 13, thereby locating the pick up fingers' blades 34 within the coil springs' barrels 35. The pick up fingers 15 are held in spaced relation during this extension step by the secondary carriage's motor 92 which cooperates to establish maximum gaps G between successive finger blocks 86, the finger blocks being restrained in that maximum gap G relation by the connector link slot 90 and pin 89 structure interconnecting adjacent finger guide blocks. This gap G preferably establishes a spacing S larger than ultimately desired between successive finger center planes 105 to insure that the take up fingers 15 will properly extend into the coil springs' barrels 36 as each continuous spring row is presented to the transport mechanism by the in-feed conveyor 51.

With the pick up fingers 15 extended as shown in FIG. 14, the secondary carriage's motor 92 is activated, thereby tending to collapse the guide blocks 86 in the in-feed direction 75 of in-feed conveyor 51 against the stationary downstream end block 86b. This results in the spacer stops 91 on adjacent finger blocks 86 being forced into contact with the upstream faces of adjacent finger blocks, such a relative motion between adjacent finger blocks being allowed because of the lost motion slots 90 in the connector links 88. This collapsed attitude of the fingers 15, which is shown in FIG. 15, establishes the final and desired pre-sized spacing S' between successive finger planes 105 to insure that the coil springs are properly positioned relative one to the other when the continuous spring row 11 is presented to the support platen 17.

Figure 16:
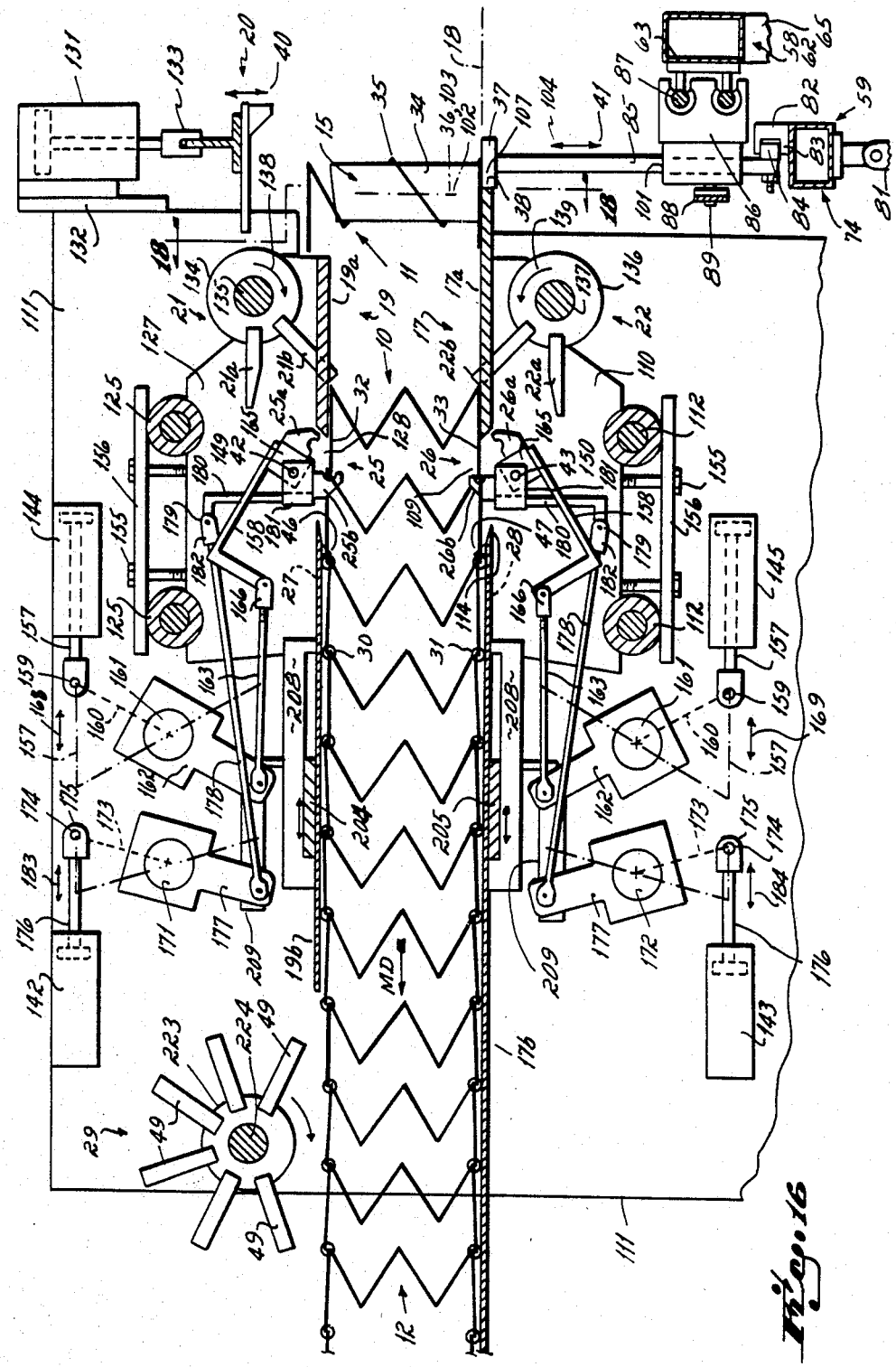
FIG. 16 is a more detailed side view of the machine as shown in FIG. 6.

With the continuous spring row 11 interengaged with the pick up fingers 15, the primary carriage 58 is caused to pivot 90° on its axis 16 by primary carriage motor 73 from the position shown in FIGS. 2 & 15 to the position shown in FIGS. 3 & 16. In this vertical attitude, the pick up fingers' bases 37 are received in seats 38 (see FIGS. 12 & 16) defined in the support platen's front edge 107, thereby properly orienting or locating the continuous spring row 11 on the front edge of the support platen. In this regard, therefore, note the finger bases 37 abutting relationship with the inner edges 108 of the support platen's seats 38 as shown in FIG. 16. Subsequently, the pick up fingers 15 are removed from interengagement with the coil springs' barrels 35, and the primary 58 and secondary 59 carriages swung back or returned to the ready position shown in FIGS. 1 and 12 through use of the primary carriage's motor 73.

Sizing & Advancing Mechanism

The machine's sizing and advancing mechanism is particularly illustrated in FIGS. 4-6, 16, 17 & 19.

Figure 17:
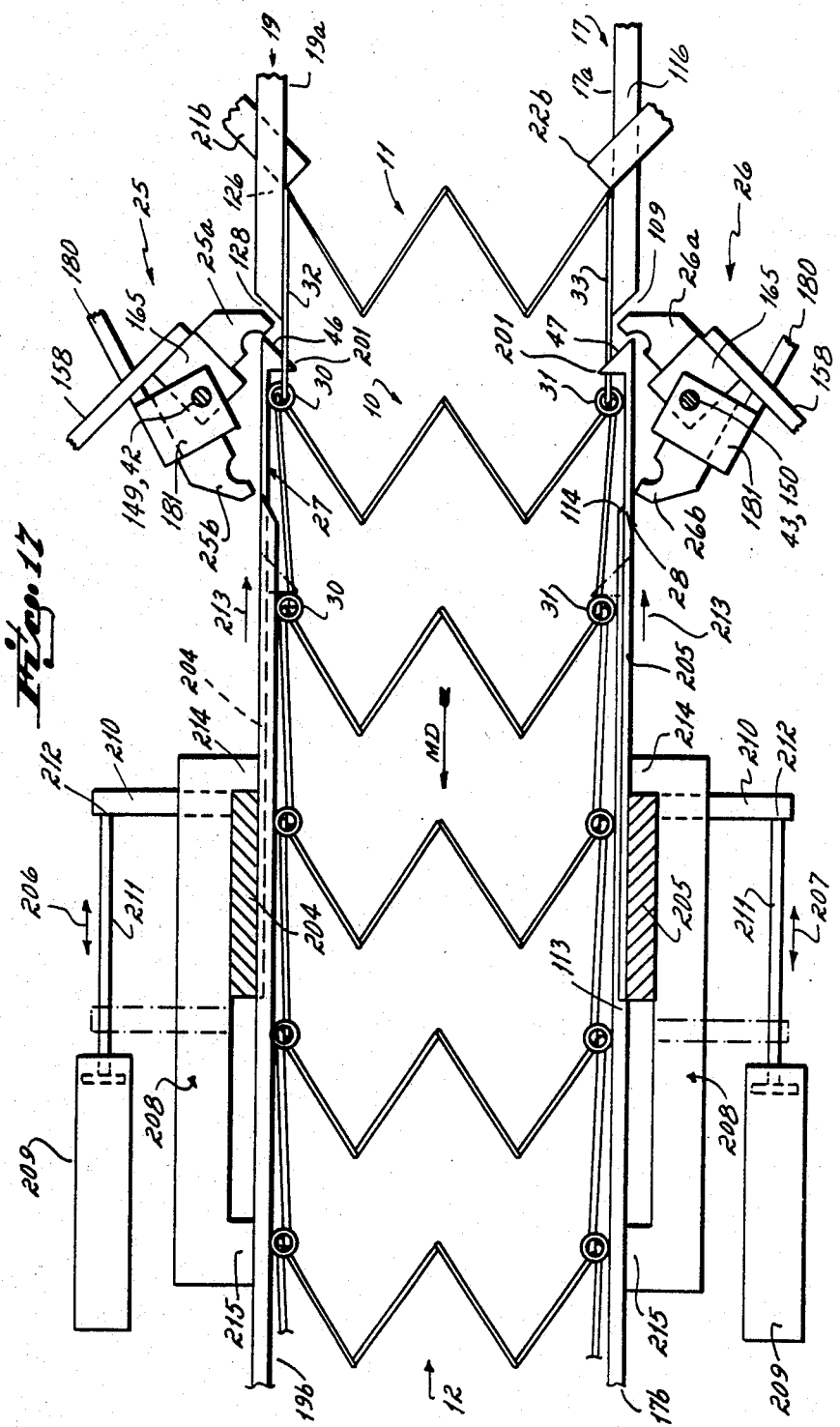
FIG. 17 is a more detailed side view similar to FIG. 8.
Figure 18:
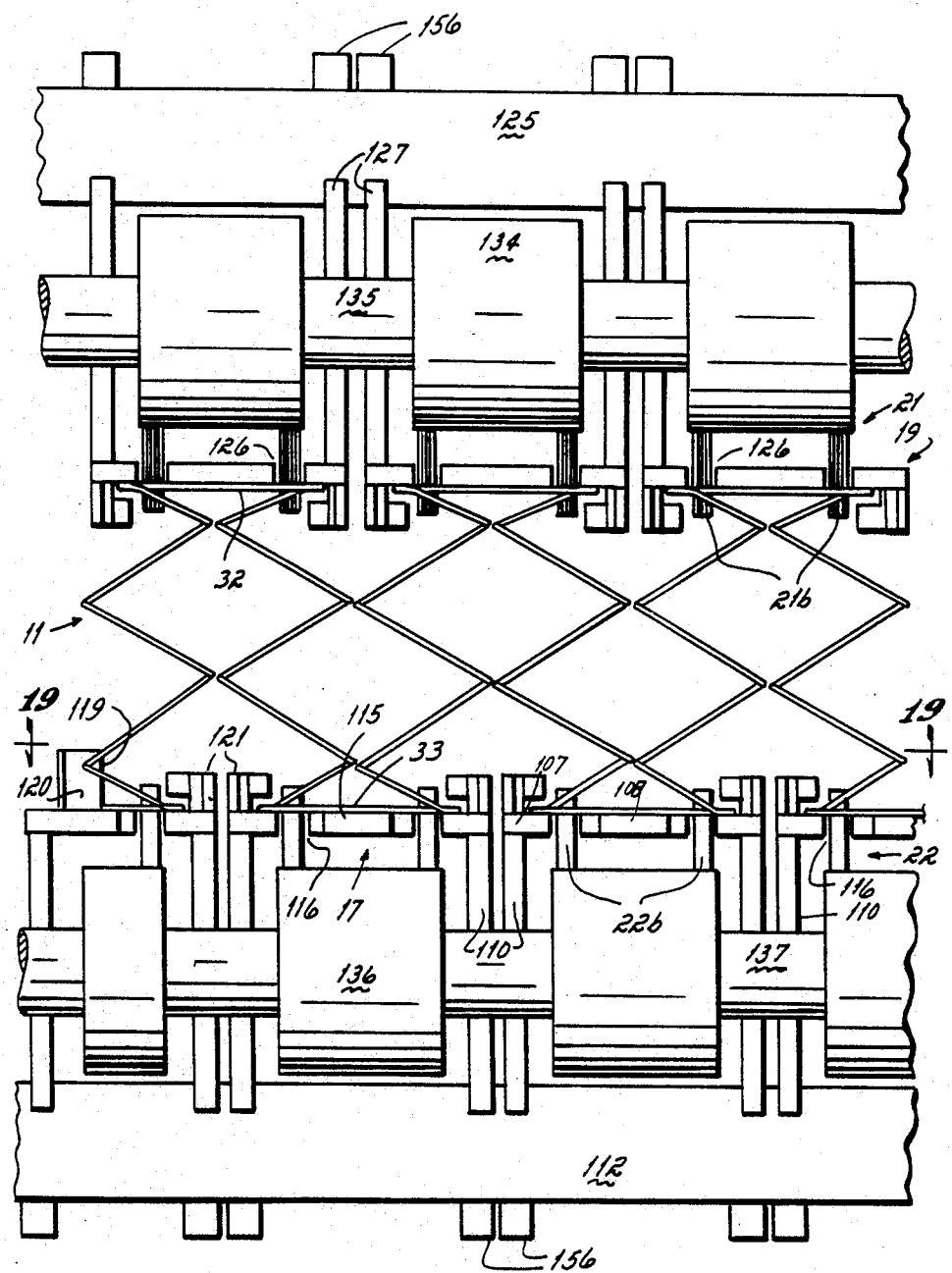
FIG. 18 is a front view taken generally along lines 18—18 of FIG. 16.

The machine's support platen 17, as shown in FIGS. 18 and 19, defines the horizontal support plane 18 for the coil spring rows. The support platen 17 is mounted on the machine frame 71. This frame 71 in the area of platen 17, includes vertical side frame members 111 rigidly connected by cross members 112. The support platen 17 is comprised of an upstream section 17a positioned upstream from the lower clamping dies 26 and a downstream section 17b positioned downstream from those clamping dies, all relative to the machine direction of the coil spring rows 12 through the machine as shown by direction arrow MD in FIG. 17. These sections 17a, 17b are separated one from the other to provide a space or gap 109 which facilitates the clamping dies 26 (to be described). The downstream section 17b rigidly attached to side frame members 111 by means not shown, is, at its downstream end, a flat plate with machine direction slots 113 formed in the leading edge 114 thereof. These slots accommodate the reciprocation of lower indexing hooks 28 as described in detail below. The upstream section 17a of the support platen 17 is comprised of a series of plates 115 rigidly fixed to cross members 112 by plate 110 (to be described in detail) and spaced laterally one from the other across the width of the machine to provide slots 116 parallel to and aligned with the slots 113 of downstream plate 17b. These slots 116 extend from the leading edge's seat 38 to the space 109 and accommodates the rotation of the advancing mechanism's lower transfer fingers 22 which project above the platen 17 during operation of the machine. Further, lower vertical guide plates 119, each with a flared leading end as at 120, is mounted on the support platen 17 to define the outside width of the coil spring assembly to be fabricated by the machine. The flared leading end 120 of the guide plates 119 cooperate with the trailing row 11 to align it properly on the platen 17. In addition, lower inner guide rails 121 are mounted to the support platen section 17a upstream of the clamping dies 26 to maintain alignment of adjacent coil springs as the row 11 progresses in the machine direction MD beyond the seat 38 in the leading edge of the support platen. In this regard, the connector loops 33 that connect adjacent coil springs is of a generally Z-shaped configuration as shown particularly in FIG. 19. These lower guide rails 121 cooperate with the generally parallel side wires 33a, 33b of the Z-shaped connector loops 33 to maintain alignment of those loops 33 for cooperation with the advancing mechanism's lower transfer fingers 22a, 22b.

The sizing platen 19 is structured similarly to the support platen 17, but in inverted or mirror relation thereto, the sizing platen including an upstream section 19a and a downstream section 19b, see FIGS. 16 & 18. The sizing platen's downstream section 19b is of a length substantially shorter than the length of the support platen's downstream section 17b since the sizing platen is merely for height control purposes of the coil spring assembly 13 during fabrication thereof, and is not necessary for support of the assembly relative to the functional components of the machine after it has been assembled. The sizing platen's downstream section 19b, however, is also in the nature of a continuous plate having slots (not shown, identical to slots 113) only at the leading edge thereof to permit reciprocatory motion of the upper indexing hooks 27. The sizing platen's leading section 19a is also structured similarly to the support platen's leading section 17a in that same defines a series of spaced machine direction slots 126 therethrough adapted to receive the advancing mechanism's upper transfer fingers 21a, 21b. The sizing platen 19 is connected by vertical plates 127 to the machine's frame 71 via cross members 125 similar to cross members 112 of support platen 17, as shown in FIG. 18. As with the support platen 17, the sizing platen's leading section 19a incorporates outer guide rails and inner guide rails for insuring that the continuous coil rows' Z-shaped connector sections 32 are maintained in alignment with the advancing mechanism 21 as the continuous coil spring row passes through this section of the machine. The upper platen 19 also presents a space or gap 128 (FIG. 16) between sections 19a, 19b for the introduction of the upper clamping dies 25.

The coil spring mechanism, as illustrated in FIG. 16, is in the form of a compression bar 20 reciprocable in a direction 40 normal to the machine's support plane 18. This compression bar 20 is positioned to overlie the upper connector loops 32 of the continuous spring row when that row is positioned on the leading edge of the support platen 17 by the transport mechanism. The compression bar 20 is vertically reciprocable through use of a fluid motor 131 fixed to the machine's frame 71 as at 132, the bar 20 being connected to the motor's piston rod by yoke 133. In this regard, note the sizing platen's leading section 19a is shorter than the support platen's leading section 17a (when viewed from the side as shown in FIG. 16) so that the coil springs of a trailing spring row 11 are not positioned between the sizing platen 19 and the support platen 17 when same are initially presented to the support platen by the transport mechanism.

The advancing mechanism for a trailing spring row 11 includes upper 21 and lower 22 pairs of transfer fingers, i.e., a set of fingers, for each spring within a spring row 11, see FIG. 18. The upper transfer fingers 21 comprise two leading fingers 21a and two trailing fingers 21b for each set of fingers 21, and the lower transfer fingers 22 also comprise two leading fingers 22c and two trailing fingers 22b for each set of fingers 22. These finger pairs are provided for cooperation with each coil spring as shown in FIG. 18. All sets of upper fingers 21 are mounted on a common rotation axis 23, and all sets of lower fingers 22 are mounted on a common rotation axis 24, neither of these rotation axes being positioned between the sizing 19 and support 17 platens. In other words, the upper transfer fingers' rotation axis 23 is positioned above the sizing platen 19 and the lower transfer fingers' rotation axis 24 is positioned beneath the support platen 17. Each set of upper transfer fingers 21 is mounted to a hub 134 which is fixed to upper driven shaft, an each set of lower transfer fingers 22 is mounted to a hub 136 which is fixed to lower driven shaft 137, as shown in FIGS. 16 and 18. The shafts 135, 137 are carried in bearings, not shown, between side frame members 111 of the main machine frame 71 and are driven or rotated in timed intermittent fashion by a motor, not shown. Note particularly that each set of transfer fingers 21, 22, as mentioned, includes a leading finger pair 21a, 22a and a trailing finger pair 21b, 22b relative to the rotational direction of the advancing mechanism as shown by upper 138 and lower 139 rotational arrows. And, all fingers 21, 22 of each set are of a length sufficient to extend through upper 12b and lower 11b slots formed through the respective sizing platen 19 and support platen 17 so as to interengage a continuous spring row positioned therebetween, all as explained in greater detail below.

In operation of the sizing and advancing mechanism, and as is illustrated in FIGS. 3 and 16, the continuous coil row 11 is first positioned by the transport mechanism in its initial location at the seat 38 of the leading edge of the support platen 17. The compression bar 20 is then extended into contact with the continuous spring row's connector loops 32 through use of fluid motor 131, compare FIG. 3 to FIG. 4, and at this point the transport mechanism's pick up fingers 15 are withdrawn cut of the coil springs' barrels 35. Subsequently, and as is shown in FIG. 5, the transfer fingers 21, 22 of the advancing mechanism are indexed through a complete rotational cycle 138, 139 by rotating upper 135 and lower 137 driven shafts. This cycle initially causes the upper 21a and lower 22a leading fingers to move interiorly of the springs' barrels 35 as shown in FIG. 5 into interengagement with the leading inside edges of the Z-shaped connector loops 32, 33 and, upon continued rotation, in effect to pull the trailing continuous coil spring row 11 out from beneath the compression bar 20 toward the upper 25 and lower 26 clamping dies into an intermediate position between the sizing platen 18 and the support platen 17. Subsequently the upper 21b and lower 22b trailing transfer fingers of the advancing mechanism interengage the trailing outside edges of the continuous spring row's Z-shaped connector loops 32, 33 to continue moving the continuous spring row 11 toward the clamping dies 25, 26 by pushing that row toward and into final position with the clamping dies as shown in FIGS. 6 & 16. It has been found that this initial pulling, and subsequent pushing, of a trailing continuous spring row 11 from beneath the compression bar 20 through the sizing 19 and support 17 platen area in uxtaposition with the leading continuous spring row 10 at the upper 25 and lower 26 clamping dies results in better control and more accurate positioning of that trailing continuous spring row relative to the leading continuous spring row in the clamping die area. Indeed, this sizing and advancing mechanism is quite simple and results in significantly less downtime than might be otherwise expected.

Clamping Mechanism

The clamping mechanism by which leading 10 and trailing 11 continuous coil rows are clamped together, prior to interconnection by lacing, is illustrated particularly in FIGS. 16, 17 & 19. As shown in FIG. 19, juxtaposed leading 10 and trailing 11 coil springs of adjacent spring rows are clamped together through use of a series of clamping dies 25 or 26. Each die jaw 25 or 26 includes a front die jaw 25a, 26a and a rear die jaw 25b, 26b. The rear die jaws 25b, 26b of all upper and lower die jaw sets are simultaneously driven, respectively by rear upper and lower jaw motors 142, 143 as explained in detail below, and the front die jaws 25a, 26a of all upper and lower die jaw sets are simultaneously driven, respectively, by upper and lower front die jaw motors 144, 145 also as described in detail below. The description herein, therefore, is for one pair of die jaws 25a, 25b or 26a, 26b within each clamping die set, it being understood that analogous jaws and analogous clamping die sets function identically one with the other across with width of the machine.

The front die 25a, 26a and rear die 25b, 26b of each clamping die 25, 26 is configured on the respective faces thereof with a spiral configuration as shown in FIG. 19 so as to cooperate with a lacing wire 30 or 31 in a manner described in detail below. These front 25a, 26a and rear 25b, 26b dies are pivotally connected in scissors-like fashion on jaw axes 42, 43, respectively. The jaw axis 43 for all lower clamping dies 26 is disposed beneath the support platen 17 and is on a common axis, and the jaw axis 42 for all upper clamping dies is disposed above the sizing platen 19 and is also on a common die axis. The upper 42 and lower 43 die axes are in a plane normal to the support plane and sizing plane defined by the support platen 17 and sizing platen 19, respectively. The upper 42 and lower 43 die axes are defined by rods 149, 150 which extend between upper 110 and lower 127 vertical platen mounting plates. Each set of the vertical upper 110 and lower 127 mounting plates is fixed on respective spaced cross frame members 112, 125 by bolts 155 and support base plate 156. The frame members 112, 125 are fixed to the side plate 111 of the machine's main frame 71. The front dies 25a, 26a are oscillated from their clamping position (FIG. 19) to their inactive position, shown in FIGS. 16 & 17 by the fluid motors 144, 145. With specific reference to FIG. 16, the free end of piston rods 157 of motors 144, 145 are connected to the free end of a link 160, the other end of this link 160 being fixedly secured to a shaft 161. This shaft 161 is journaled for rotation in frame plates 111, by means not shown and carries a plurality of links 162 which are non-rotatably fixed thereto for rotation with the shaft 161, a link 162 being provided for each die set 25a, 26a. The free end of each link 162 is pivotably secured to one end of a connector bar 163, the other end of which is pivoted to the free end of an arm 158 extending from a front die mounting block 165. Each front die mounting block is rotatably secured to the shafts 149, 150 and has a front die set 25a, 26a fixedly mounted thereto. In order to adjust the limit of oscillatory movement toward and away from a die clamping position, the connector arm 163 is threaded into a yoke 166, the yoke in turn being the pivot connection to the arm 158. The front die fluid motors 144, 145 reciprocate piston rods 157 in direction shown by upper and lower arrows 168, 169, respectively, thereby causing pivotal motion of the drive links 162 fixed to each drive arm's shaft 161 which, in turn, induces scissors-like opening and closing motion of the upper 25a and lower 26a clamping dies, respectively.

The rear dies 25b, 26b of the clamping dies are connected with rear die fluid motors 142, 143 in similar fashion to the connections provided for the front dies 25a, 26a of the clamping dies. Also as shown in FIG. 16, the rear dies 25b, 26b of the clamping dies are all driven by upper 171 and lower 172 rear die drive shafts. Each drive shaft 171, 172 is connected by drive arm link 173 with a rear die fluid motor 142 or 143. The drive arm link 173 is immobily fixed to the rear die drive shaft 171 or 172, and is pivotally connected as at 174 to the free end 175 of a fluid motor's piston rod 176 at one end. The shafts 171, 172 have keyed thereon (or now rotatably mounted thereto) a plurality of links 177, a link 177 being provided for each die set 25b, 26b. The free end of each drive arm link 177 is pivotally connected to a connector bar 178, that connector bar being pivotally connected as at 179 to a right angled driven arm link 180 at the other end. The driven arm link 180 is fixed to a rear die mounting block 181. This block 181 is rotatably secured to the shafts 149, 150 and mounts the rear die set 25b, 26b. The connector link 178 is threadably connected to a saddle 182 which is, in turn, pivotally connected as at 179 to the driven arm link 180, to precisely adjust the rear clamping dies 25b, 26b when the machine is set up for operation. As with the front dies, fluid motors 144, 145, the rear dies' fluid motors 142, 143 also reciprocates piston rods 176 in a direction shown by upper 183 and lower 184 direction arrows. Note particularly that both the upper 25 and lower 26 clamping dies are located in the spaces 109, 128 defined between the sizing platen's leading section 19a and trailing section 19b, and between the support platen's leading section 17a and trailing section 17b, respectively, so that the dies can move between an active clamping position (shown in FIGS. 7 and 19) where same are positioned between the sizing platen 19 and the support plane 18, and an inactive storage position (shown in FIGS. 8 and 17) where same are positioned above and below, respectively, the sizing plane and support plane.

Operation of the clamping die mechanism is illustrated in FIGS. 5–8, 16 and 17. In the ready position of the clamping die mechanism, which is illustrated in FIGS. 5 and 16, the rear die jaws 25b, 26b of the upper 25 and lower 26 clamping dies are extended below and above, respectively, the sizing platen 19 and support platen 17. In this position, the rea dies act as stops for the leading continuous spring row 10, the Z-shaped end loops 32, 33 of that row in effect being grabbed by the rear die jaws 25b, 26b so as to properly position that leading continuous spring row relative to the next trailing spring row. As the trailing spring row 11 is advanced from the compression bar 20 toward the clamping dies 25, 26, and as is shown in FIG. 6, the rear dies 25b, 26b also function as a stop to properly position the trailing continuous spring row 11, the Z-shaped connectors 32, 33 of that trailing row being received also within the grooves defined by the rear clamping dies 25b, 26b, see FIG. 16. Next in the sequence, the clamping dies' front dies 25a, 26a close in response to the front die motors 144, 145, extension of the piston rods 157 from the solid line position to the phantom line position shown in FIG. 16 causing the drive arm linkage 160, 162 to move from the solid line position shown in FIG. 16 to a phantom line position, not completely shown, where the clamping dies 25, 26 are closed as shown in FIG. 7. This, of course, causes the front dies 25a, 26a to move in scissors-like fashion on die axes 42, 43 into the die closed position shown in FIG. 7. In the clamping die 25, 26 closed position, the Z-shaped connectors 32, 33 of the adjacent or juxtaposed leading continuous spring row 10 and trailing continuous spring row are clamped together one with the other preparatory to being laced together by spiral lacing wires 30, 31. After the lacing wires 30, 31 have connected the adjacent leading 10 and trailing 11 continuous coil rows (as explained in detail below), the rear dies' motors 142, 143 are activated for moving the rear die linkage 173, 177, 178 from the solid line position shown in FIG. 16 to a phantom line position not entirely shown, thereby causing the rear dies 25b, 26b to open to the attitude shown in FIG. 17. Simultaneously, the front dies 25a, 26a are opened by causing the front die motors 144, 145 to move back into the solid line position shown in FIGS. 16 and 17. In this open or inactive position where both front 25a, 26a and rear 25b, 26b dies of each clamping die 25, 26 are open, the entire coil spring assembly can be indexed in the machine direction MD as described in detail below. Subsequently, the rear dies 25b, 26b are moved back into the active position shown in FIGS. 16 and 1 for commencement of the next cycle with the next succeeding continuous spring row 11.

Lacing Mechanism

When the clamping dies 25, 26 are closed as shown in FIG. 7, the machine's lacing mechanism is activated. This lacing mechanism, which is primarily shown in FIGS. 10, 12, 12a & 12b, includes a lacing wire forming apparatus 185 of any type well-known to the prior art. This type apparatus takes a spring wire and coils it into a lacing coil 30, 31 configuration (see, e.g., U.S. Pat. Nos. 3,541,828 and 3,122,177), and thereafter causes that lacing coil to wind or travel or lace its way from the near side edge 186 of the coil spring assembly toward the other side edge 187 thereof (see, e.g., U.S. Pat. No. 3,503,115). As the lacing coils 30, 31 traverse the juxtaposed spring rows 10, 11, and as shown in FIGS. 12 and 19, it is guided in either the assembly's upper or lower plane by the clamping dies 25, 26 for interconnecting juxtaposed Z-shaped end loops 32, 33 in either the top plane or the support plane 18 of the adjacent coil spring rows. Particularly as shown in FIG. 19, the spiral lacing wire 31 moves in the direction shown by arrows 188 between the front 25a, 26a and rear 25b, 26b dies of each clamping die to accomplish tying together of adjacent continuous spring rows 10, 11.

In each of the top plane and the support plane 18 of the adjacent coil spring rows 10, 11, the lacing coil forming apparatus 185 is positioned so that a linear axis 189 is established between the forming apparatus' outlet 185a and the prospective laced joint defined by the clamping dies 25 or 26. A stop mechanism 197 operative to stop the helical lacing wire 30 or 31 (in the event that the wire encounters an obstacle in the course of being wound in lacing fashion about the spring's juxtaposed end loops 32, 33) is positioned between the lacing coil forming apparatus 185 and the near side 186 of the coil spring assembly 12. This stop mechanism 197 includes a sensor 190 that functions to sense when and if the helical lacing wire is encountering an obstacle as it is wound onto the end loops of coil springs in adjacent spring rows 10, 11, as well as a clamp device 193 that functions to clamp the helical lacing wire 30 or 31 between its jaws 191, 192 after the wire has completely laced adjacent rows 10, 11 together. More specifically, the sensor 190, as particularly shown in FIGS. 12a and 12b, includes a micro switch 198 that cooperates with a bowed guide element 199 for the lacing wire, that bowed guide element being positioned in the lacing wire's path between the lacing coil forming apparatus 185 and the assembly's near side 186. The bowed guide element 199 functions to guide the lacing wire across the transition area after it leaves the apparatus 185 until it becomes interconnected with the adjacent spring rows 10, 11. Note particularly the guide element 199 defines a curved or bowed path 200 section which is bowed out of the lacing coil's linear axis 189. The bowed guide element 199, as shown in FIG. 12b, is of a channel shaped configuration which is open at side 216. As shown in FIG. 12a, the micro switch 198, includes a conventional spring (not shown) loaded plunger 217. This plunger is mounted on side wall 218 of the bowed guide element 199 so that the plunger extends into the interior of the guide channel through port 219 formed in side wall 218. Since the spring loaded plunger 217 is spring loaded away from switch base 220, it remains in continuous contact with the lacing coil 30 or 31 as that lacing coil passes through the guide element 199. In lieu of the micro switch 198, a conventional proximity switch may be used to detect the presence or absence of the helical in the channel. The clamp device 193 includes movable 191 and fixed 192 jaws. The movable jaw 191 is driven by fluid motor 194. The clamp's jaws 191, 192 are positioned, as shown in FIG. 12, so as to interengage the lacing wire 30 or 31 in clamping relation when a feeder switch 226 is activated. The feeder switch 226 is mounted on side guide rail 119 on the far side (relative to the forming apparatus 185) of the spring assembly 12 from the clamp device 193 in a position on that rail 119 where lacing coil 30 or 31 will abut that switch after the lacing coil has completely laced the two rows 10, 11 together.

In other words, the sensor 190 and lacing coil forming apparatus 185 are connected together in a circuit (not shown) so that the forming apparatus 185 is stopped when the lacing wire is stalled for whatever reason in its forward progress (as shown by direction arrow 188) as it traverses the spring assembly when lacing adjacent rows 10, 11 together. And the feeder switch 226, forming apparatus 185 and clamp device 193 are connected together in a circuit (not shown) so that the clamp device can grab or clamp the lacing coil 30 or 31 and the forming apparatus 185 stopped after the lacing coil has traversed the entire length of the spring rows 10, 11.

In operation of the lacing mechanism, and as the spiral lacing wire 30 or 31 proceeds from the lacing coil forming apparatus 185 into spiral lacing relation with opposed Z-shaped connector loops 32, 33 of adjacent continuous spring rows 10, 11 without any hang-up or hindrance, the lacing coil forming apparatus continues to feed out the spiral lacing coil. But if the lead end 195 of the lacing wire gets hung up for any reason as it passes through the clamping dies 25, 26, (and prior to contact of that lead end 195 with feeder switch 226), then that section 196 of the lacing coil within the bowed guide element 199 (i.e., that section 196 between the lacing coil forming apparatus 185 and the closest edge 186 of the coil spring assembly 12) tends to bow out or jump out of the guide element as shown in phantom lines in FIGS. 12 & 12a. When the spiral lacing wire 30 or 31 bows outwardly from the guide element 199, the sensor 190 is activated. And when the sensor 190 is activated the circuitry (not shown) causes the lacing coil forming apparatus 185 to be stopped until the hang up or obstacle is removed at which time the forming apparatus is re-started. If the lacing wire's lead end 195 encounters no obstacle or hang up as it traverses the entire length of adjacent rows 10, 11 in lacing fashion, that lead end finally contacts feeder switch 226 on far guide rail 119. When feeder switch 226 is activated the circuitry (not shown) also activates the clamp device 193. This causes the spiral lacing wire to be clamped between the clamp's jaws 191, 192. Subsequently, a cut off mechanism (not shown) is activated to cut the lacing wire preparatory to indexing the next spring row into lacing proximity with dies 25, 26. After the spiral lacing wire 30 or 31 is cut, the clamp device 193 prevents that lacing wire not laced with the spring assembly from springing forward and winding itself into the coil spring assembly (due to built up torque in the lacing wire as provided by the forming apparatus) until the assembly has been indexed in the machine direction MD by the indexing mechanism 27, 28 as explained in greater detail below. It is to be understood that while only one lacing mechanism and clamping apparatus have been described in detail, the coil assembly apparatus of this invention anticipates the use of two such structures, one for the top and one for the bottom as shown diagrammatically in FIGS. 10 and 11.

Indexing and Feed-Out Mechanism

The machine's indexing mechanism is particularly shown in FIGS. 7–9, 16 and 17. This indexing mechanism includes upper 27 and lower 28 indexing hooks, a pair of such hooks being provided for cooperation with each Z-shaped connector loop 32, 33, see FIG. 19. Each upper 27 and lower 28 hook is provided with a barbed end 201 having a cam edge 46, 47 as the leading edge thereof and the hooks 27, 28 as the rear edges thereof. The indexing hooks 27, 28 are fixed to upper 204 and lower 205 mounting bars, respectively, each of which extends across the width of the machine. Each mounting bar 204, 205 is supported for reciprocatory motion, as shown by upper 206 and lower 207 arrows in FIG. 17, in a guide frame 208 mounted to the underside of the support platen 17 and mounted to the top side of the sizing platen 19, respectively. The top 204 and bottom 205 indexing hook mount bars are moved by an indexing fluid motor 209 connected to the respective mount bar by a bracket 210 to which the motor's piston rod 211 is fixed as at 212.

In operation, and after the upper 30 and lower 31 spiral lacing wires have connected together leading 10 and trailing 11 continuous spring rows as shown in FIG. 17, and after the front 25a, 26a and rear 25b, 26b dies have been opened as shown in FIG. 17, the indexing hooks 27, 28, both upper and lower, are all simultaneously extended in the counter machine direction 213 by indexing hook motors 209. As the indexing hooks 27, 28 are extended, the front cam edges 46, 47 of the hooks cause the top 30 and bottom 31 lacing wires and the springs' Z-shaped connector loop 32, 33 to be cammed over the hooks, thereby locating the hooks on the upstream side of the newly formed spiral lacing connections 30, 31 relative to the machine direction MD of the machine. This extended position of the indexing hooks 27, 28, as shown in solid lines in FIGS. 8 and 17, is established by locating the hooks' mounting bars 204, 205 against upstream post 214 of the hooks' guide frames 208. Subsequently, the hooks 27, 28 are indexed in the machine direction MD by the hook motors 209 until the mounting bars 204, 205 are positioned against the downstream posts 215 of the guide frames 208 as shown in FIG. 16. As the indexing hooks are indexed rearwardly (machine direction MD) into the phantom line position shown in FIG. 17 and the solid line position shown in FIG. 16, the leading row 10 (previously connected trailing coil spring row 11), and the downstream assembled rows 12 to which it is now tied or laced, move that assembly 12 in the machine direction MD a distance substantially equal to the width of one row. The distance of the one-way stroke of the indexing hooks 27, 28 is effectively equal to the width W of one spring row. After the newly formed spiral lacing wire 30, 31 connections have cleared the rear clamping dies 25b, 26b, and prior to the indexing hooks 27, 28 achieving their rearmost or retracted position, the rear clamping dies are moved back to the active position by rear die motors 142, 143, thereby permitting the rear clamping dies to interengage the Z-shaped end loops 32, 33 of the continuous spring row (which previously was the trailing spring row, and which now relative to a new trailing coil row will be the leading coil row) in proper position for juxtaposition with the new trailing coil row, compare FIGS. 8 and 1.

The machine's feed-out mechanism 29 is particularly illustrated in FIGS. 9 and 16. That feed-out mechanism 29 provides a series of six finger sets, the fingers 49 of each set being mounted on a hub 223 which is carried on a common shaft 224, a plurality of these hubs and finger sets being strategically spaced along the axis 48 of shaft 224 (for example, four). This shaft 224 is carried in bearings, not shown, mounted on side frame members 111 of the main machine frame 71, and is driven by a motor, not shown. Each of the feed-out fingers 49 is adapted to cooperate with the top lacing wire 30 connection, and several of the top Z-shaped connector loops 32, of connected adjacent rows of the coil spring assembly 12 as formed. Except for them being fewer in number, these sets of feed-out fingers 29 are spaced across the width of the coil spring assembly 12 in much the same nature as the sets of transfer fingers 21 of the advancing mechanism are spaced across a continuous coil spring row. Note particularly that the fingers 29 are each of a length sufficient to extend beneath the sizing plane (defined by the lower surface of platen 17) into interengagement with successive rows of coil springs. However, also note particularly that about 25% of the periphery of hub 223 has no fingers, thereby providing a void in the feed-out mechanism 29 that will not engage the assembly 12 during the assembly indexing sequences, as shown in FIG. 16.

In operation, and after the final or last continuous coil spring row has been connected by spiral lacing wires 30, 31 at the clamping dies 25, 26 to form the fabricated coil spring assembly 12, the clamping dies are open to their inactive position as shown in FIGS. 9 and 17. When these conditions exist, fingers 29 are activated or cycled through a single revolution (partially shown in FIG. 10). That single revolution of the feed-out fingers 29 causes the last trailing continuous coil row of the assembly 12 to be moved a significant distance, i.e., a distance equal to the width of six continuous coil spring rows, away from the clamping dies 25, 26 area and well downstream of the indexing hooks 27, 28. In this final location, as shown in FIG. 9, the coil spring assembly 12 can be easily removed from the support platen's rear section 18b by conveyor equipment (not shown) or in manual fashion by an operator, thereby preparing the machine for fabrication of a new coil spring assembly. This feed-out mechanism 29, therefore, insures that the leading coil spring row of the next coil spring assembly does not interfere or become intangled with the last coil spring row of the preceding coil spring assembly when the preceding assembly has been finished and it is desired to start fabrication of a new assembly.

Having described in detail the preferred embodiment of our invention, what we desire to claim and protect by Letters Patent is:

1. A machine for sizing a group of coil spring to a predetermined desired height during fabrication of a coil spring assembly, said machine comprising
   a machine frame,
   an elongated support platen mounted upon said frame for supporting a plurality of said springs positionable on said support platen in desired group configuration with said springs' axes being generally normal to said platen,
   an elongated compression bar positioned on said frame in a location spaced from said support platen, said bar being adapted to simultaneously engage the top end loops of coil springs positioned on said support platen, and
   means mounted upon said frame for moving said compression bar in a direction generally normal to said support platen, said compression bar being moveable between extended and retracted positions relative to said support platen, said compression bar being moved into said extended position from said retracted position so as to simultaneously compress said plurality of coil springs upon contact of said bar with the top loops of said coil springs, a predetermined desired height of said coil springs relative to said support platen being established by said compression bar in said compression bar's extended position.

2. A machine as set forth in claim 1, said machine further comprising
   a sizing platen mounted upon said frame, said sizing platen being disposed generally parallel to said support platen, the distance between said support platen and said sizing platen cooperating to maintain said coil springs at a predetermined desired height when said compression bar is in said retracted position.

3. A machine as set forth in claim 2, said machine further comprising
   an advancing mechanism mounted upon said frame and adapted to cooperate with said group of coil springs, said advancing mechanism being structured to draw said coil springs away from underneath said compression bar into a position between said support platen and said sizing platen when said compression bar is in said extended position.

4. A machine as set forth in claim 3, said advancing mechanism comprising
   first and second transfer fingers adapted to cooperate with at least on of the top end loop and the bottom end loops of said coil spring group, said first transfer finger functioning to pull said coil springs away from said compression bar and said second transfer finger functioning to push said coil spring away from said compression bar.

5. A machine as set forth in claim 4, said machine comprising
   at least one of said sizing and support platens having slots therein, said transfer fingers extending through said slots for pulling and then pushing said coil springs away from underneath said compression bar.

6. A machine as set forth in claim 5, said advancing mechanism comprising
   upper and lower sets of transfer fingers adapted to cooperate with said group of coil springs, each set including first and second transfer fingers, one set of said fingers being positioned to cooperate with a top end loop of said coil spring group and the other set of said fingers being positioned to cooperate with a bottom end loop of said coil spring group, and
   said support platen and said sizing platen both having slots therein, said slots permitting said first finger of each finger set to contact a coil spring from inside the barrel of that coil spring and said second finger of each finger set to contact said coil spring from outside the barrel of that coil spring.

* * * * *